(12) United States Patent
Kuo et al.

(10) Patent No.: US 9,774,916 B2
(45) Date of Patent: Sep. 26, 2017

(54) INFORMATION CONCENTRATING CENTER CAPABLE OF MAKING P2P CONNECTIONS WITH REMOTE CLIENT DEVICES

(71) Applicants: ThroughTek Technology (ShenZhen) Co., Ltd., Shenzhen (CN); ThroughTek Co., Ltd., Taipei (TW)

(72) Inventors: Chi-Ming Kuo, Taipei (TW); Yu-Li Kao, Taipei (TW); Bai-Jian Xiao, Taipei (TW); Cheng-Wei Li, Taipei (TW)

(73) Assignees: ThroughTek Technology (ShenZhen) Co., Ltd., Shenzhen (CN); ThroughTek Co., Ltd., Taipei (TW)

( * ) Notice: Subject to any disclaimer, the term of this patent is extended or adjusted under 35 U.S.C. 154(b) by 0 days.

(21) Appl. No.: 14/591,008

(22) Filed: Jan. 7, 2015

(65) Prior Publication Data

US 2015/0128199 A1 May 7, 2015

Related U.S. Application Data

(63) Continuation-in-part of application No. 13/950,282, filed on Jul. 25, 2013, which is a continuation-in-part of application No. 13/293,506, filed on Nov. 10, 2011.

(60) Provisional application No. 61/924,240, filed on Jan. 7, 2014.

(51) Int. Cl.
| | |
|---|---|
| *G06F 15/173* | (2006.01) |
| *H04N 21/4788* | (2011.01) |
| *H04N 21/61* | (2011.01) |
| *H04L 29/12* | (2006.01) |
| *H04L 12/28* | (2006.01) |
| *H04L 29/06* | (2006.01) |
| *H04L 12/64* | (2006.01) |

(52) U.S. Cl.
CPC ..... *H04N 21/4788* (2013.01); *H04L 12/2818* (2013.01); *H04L 12/6418* (2013.01); *H04L 61/1535* (2013.01); *H04L 65/00* (2013.01); *H04N 21/6168* (2013.01); *H04N 21/6175* (2013.01); *H04N 21/6193* (2013.01)

(58) Field of Classification Search
CPC ............ H04L 12/2818; H04L 12/6418; H04L 61/1535; H04L 65/00; H04N 21/4788; H04N 21/6168; H04N 21/6175; H04N 21/6193
USPC .................................................. 709/220–226
See application file for complete search history.

(56) References Cited

U.S. PATENT DOCUMENTS

| | | | |
|---|---|---|---|
| 2008/0310425 A1* | 12/2008 | Nath ................. | H04L 29/12028 370/395.54 |
| 2009/0125971 A1* | 5/2009 | Belz et al. ..................... | 725/153 |
| 2009/0298535 A1* | 12/2009 | Klein ............... | H04N 21/43615 455/556.1 |

(Continued)

*Primary Examiner* — Normin Abedin
(74) *Attorney, Agent, or Firm* — Min-Lee Teng; Litron Patent & Trademark Office

(57) ABSTRACT

An information concentrating center, is disclosed, wherein the information concentrating center comprises: at least one module for concentrating information from at least one information source; and at least one module coupling to the Internet, for establishing a P2P connection with a remote client device through the Internet, wherein at least one portion of the information is delivered to the remote client device on the P2P connection.

16 Claims, 23 Drawing Sheets

(56) References Cited

U.S. PATENT DOCUMENTS

| | | | | |
|---|---|---|---|---|
| 2010/0185771 A1* | 7/2010 | Gurun | ............... | G06F 15/173 |
| | | | | 709/227 |
| 2011/0066739 A1* | 3/2011 | Gillespie | ........... | H04L 29/12509 |
| | | | | 709/229 |
| 2011/0085526 A1* | 4/2011 | Joseph | .............. | H04M 1/72533 |
| | | | | 370/338 |
| 2011/0307930 A1* | 12/2011 | Rouse | ................ | H04N 21/2387 |
| | | | | 725/98 |
| 2012/0242526 A1* | 9/2012 | Perez | ..................... | G08C 17/02 |
| | | | | 341/176 |
| 2013/0111043 A1* | 5/2013 | McGuire | .............. | H04L 61/256 |
| | | | | 709/228 |

\* cited by examiner

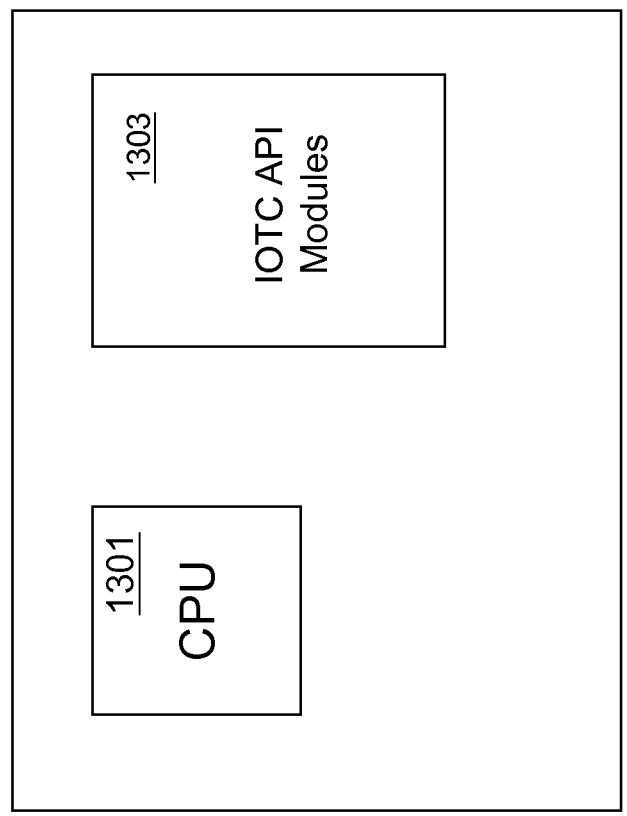

INFORMATION CONCENTRATING CENTER CAPABLE OF MAKING P2P CONNECTIONS WITH REMOTE CLIENT DEVICES

CROSS REFERENCE TO RELATED APPLICATIONS

This application is a continuation-in-part of U.S. patent application Ser. No. 13/950,282, filed Jul. 25, 2013, which is a continuation-in-part of U.S. patent application Ser. No. 13/293,506, filed Nov. 8, 2011 and claims the benefit of U.S. provisional application No. 61/924,240, filed Jan. 7, 2014, each of which is incorporated by reference herein in their entirety.

BACKGROUND OF THE INVENTION

Field of the Invention

The present invention relates to a communication system and more particularly to a communication system using P2P (Point to Point) connections.

Description of the Prior Art

Conventionally, a set top box is used to connect with a television to watch TV programs which are sent through satellite or cable. The set top box can be viewed as an information concentrating center in which varieties of information can be concentrated, and information, such as video and audio, can then be delivered to a device, such as a TV for viewing. However, conventional set top box is used mainly for providing information to TV for viewing and hence has limited use. Therefore what is needed is an effective and efficient way to explore the full capability of a set top box.

SUMMARY OF THE INVENTION

One object of the present invention is to provide an effective and efficient way to connect an information concentrating center through the internet by using a P2P connection.

Present invention discloses a way to set up the connection from the remote client device to the information concentrating center through the internet by establishing a P2P (point to point) connection from the remote client device to the information concentrating center. By using a P2P connection between the remote client device and the information concentrating center, bidirectional communication can be established for not only accessing services such as streaming video conferences or inspecting statuses of appliances at home provided by the information concentrating center, but also sending control information, such as switching TV channels, from the remote client device to the information concentrating center.

In one embodiment, an information concentrating center, comprising: at least one module for concentrating information from at least one information source; and at least one module connected to a routing device, for establishing a P2P connection with a remote client device through Internet, wherein at least one portion of the information is delivered to the remote client device on the P2P connection. In one embodiment, the at least one information source includes a satellite feed and/or a cable feed.

In one embodiment, the information concentrating center has a unique identification (UID) for allowing the remote client device to establish the P2P connection, wherein the unique identification is registered in a linking server and the P2P connection is established through the linking server.

In one embodiment, the remote client device is not registered in the linking server when the remote client device sends a first message to the linking server for establishing a P2P connection with the information concentrating center according to the unique identification (UID) of the information concentrating center.

In one embodiment, the remote client does not have a unique identification (UID) to register to the linking server when the remote client device sends the first message to the linking server for establishing a P2P connection with the information concentrating center.

In one embodiment, the linking server transmits hole-punching messages to the information concentrating center and the remote client device to establish the P2P connection.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein:

FIG. 13A-13D illustrates a block diagram of an integrated circuit in accordance with one embodiment of present invention;

DETAILED DESCRIPTION OF THE INVENTION

The detailed explanation of the present invention is described as following. The described preferred embodiments are presented for purposes of illustrations and description, and they are not intended to limit the scope of the present invention.

In the following description, "remote device" and "remote client device" are exchangeable when a "proximal device" acts as a service device that provides a service to a remote device.

The remote information communication system of the present invention comprises at least one remote device, an administration server, and at least one linking server. The remote information communication system is requested by at least one proximal device to establish a link between the proximal device and the remote device. The linking method of the remote information communication system comprises steps of: A. at least one remote device requesting an administration server to provide an address of at least one linking server supporting the remote device via the Internet; B. the remote device registering the information thereof in the linking server according to the address provided by the administration server; C. a proximal device requesting the administration server to find out a specified remote device via the Internet; D. the administration server responding the address of the linker server that the specified remote device registers to the proximal device; E. a proximal device requesting the linking server to establish a link with the specified remote device according to the responded address; F. the linking server establishing a link between the proximal device and the specified remote device according to the request of the proximal device. The present invention has the following features: the linking server and the remote device needn't open the domain names or IPs to the public; all proximal devices can only request the administration server to find out a specified remote server; the administration server provides IP of the linking server for the proximal device; the proximal server requests the linking server to establish a link between the proximal device and the remote server. Thereby is reduced the probability that the linking server or the remote device is invaded by hackers. It is unnecessary for the proximal device to have a fixed IP or remember fixed IPs or domain names. Thus, the user of the proximal device is exempted from many technical problems of linking.

Figure 1:
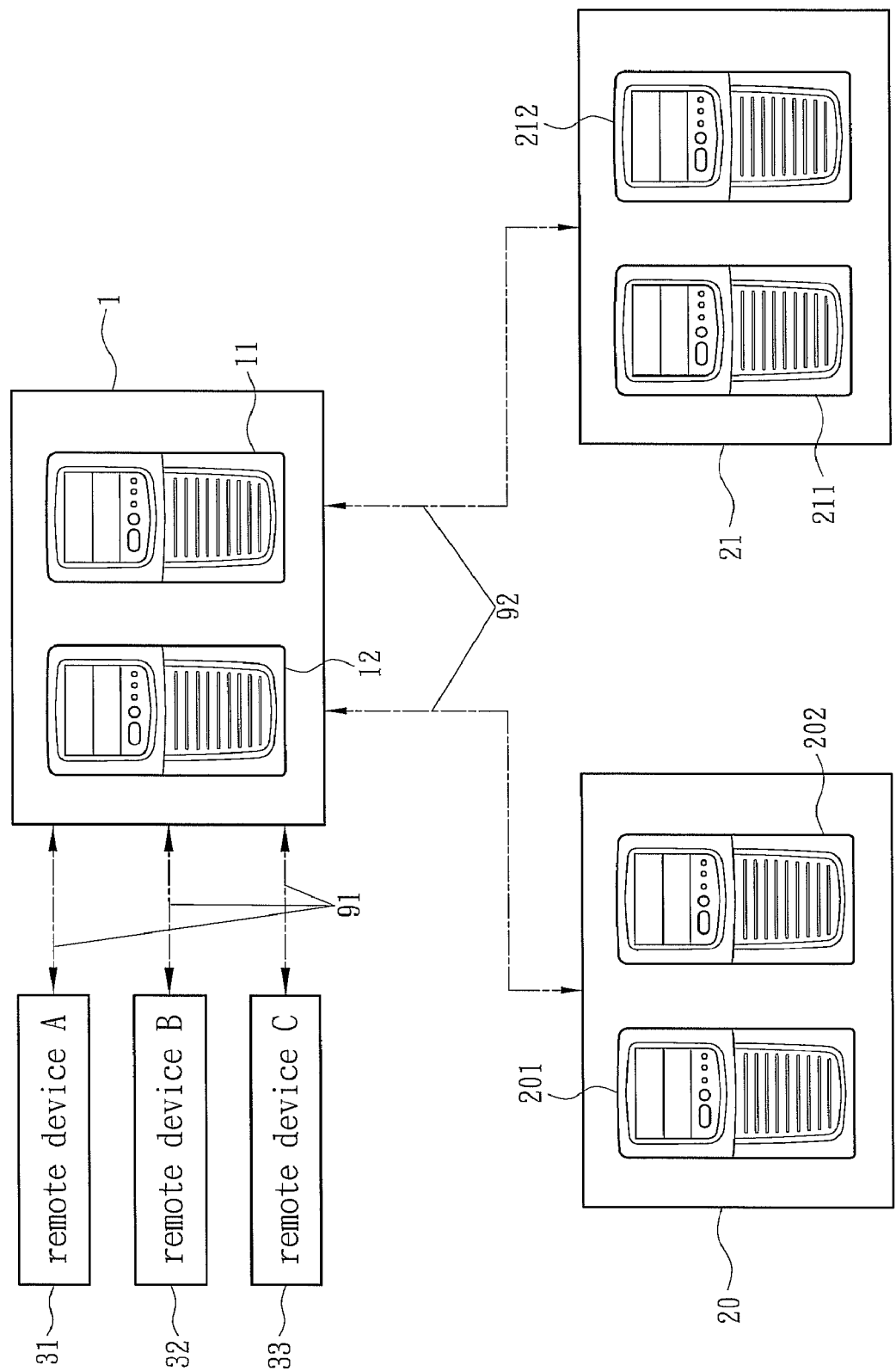
FIG. 1 is a first diagram schematically showing the architecture of a remote information communication system according to a first embodiment of the present invention.

In order to demonstrate the above-mentioned method in detail, the present invention further discloses a practical remote information communication system, which comprises at least one administration server, at least one linking server and at least one remote device. Refer to FIG. 1 a diagram schematically showing the architecture of a remote information communication system according to one embodiment of the present invention. As shown in FIG. 1, two administration servers 11 and 12 constitute an administration server group 1 that back up with each other. Each of the administration servers 11 and 12 stores a device list and a server list. The device list stores the data of a plurality of remote devices allowed for registering. The server list stores the information of a plurality of linking servers. In one embodiment, the server list contains a plurality of linking servers managed by different service providers. In one embodiment, the server list contains a plurality linking servers supporting different types of devices. In one embodiment, the server list contains a plurality linking servers distributed at different geographic locations. In one embodiment, the device list and the server list have a mapping relationship therebetween. As shown in FIG. 1, the remote information communication system includes a linking server 201 and a linking server 211. In this embodiment, the linking server 201 and a linking server 202 are respectively managed by different service providers. As shown in FIG. 1, the linking server 201 and the linking server 202 constitute a linking server group A (20) that back up with each other. Similarly, the linking server 211 and a linking server 212 constitute a linking server group B (21) that back up with each other. In order to describe the present invention conveniently, the administration server group 1, the linking server group A (20) and the linking server group B (21) are used to represent the servers of the linked targets thereinafter. The remote information communication system also includes a remote device A (31), a remote device B (32) and a remote device C (33). As stated hereinbefore, the device list stores the information of a plurality of remote devices. The remote devices A, B and C (31, 32 and 33) respectively have their unique IDs. The information of the service providers managing the remote devices A, B and C (31, 32 and 33) are stored in the device list of the administration server group 1 beforehand. When the linking server group A (20), linking server group B (21), remote device A (31), remote device B (32) and remote device C (33) has just accessed the Internet, the linking server group A (20) and linking server group B (21) transmit server-register information 92 to the administration server group 1 via the Internet to register the IPs and configurations thereof (such as the specifications, linking states, etc.). The administration server group 1 then verifies whether the linking server group A (20) and linking server group B (21) are the legal server groups pre-stored in the server list. If they are legal server groups, the administration server group 1 respectively responds to the linking server group A (20) and linking server group B (21) that their registers are done. When the remote device A, B or C (31, 32 or 33) intend to find out servers able to support them, it sends out linking server requesting information 91 to the administration server group 1 via the Internet. The administration server group 1 then verifies whether the remote device A, B or C (31, 32 or 33) is the legal device pre-stored in the device list. If the remote device A, B or C (31, 32 or 33) is a legal device, the administration server group 1 responds linked targets to it.

In practical application, the linking server group A (20) and the linking server group B (21) may be respectively managed by different service providers. In such a case, the administration server group 1 would assign the remote device A (31) to the linking server group A (20), which is managed by the service provider supporting the remote device A (31). Similarly, the administration server group 1 assigns the remote device B (32) and the remote device C

(33) to the linking server group B (21) which is managed by the service provider supporting the remote device B (32) and the remote device C (33). In one embodiment, the remote devices A, B and C (32, 32 and 33) respectively belong to different types of products, and the administration server group 1 respectively assigns them to the linking server group A (20) and the linking server group B (21). In one embodiment, the remote devices A, B and C (31, 32 and 33) are respectively at different geographic locations, and the administration server group 1 assigns each to the nearer linking server group A (20) or nearer linking server group B (21).

Figure 2:
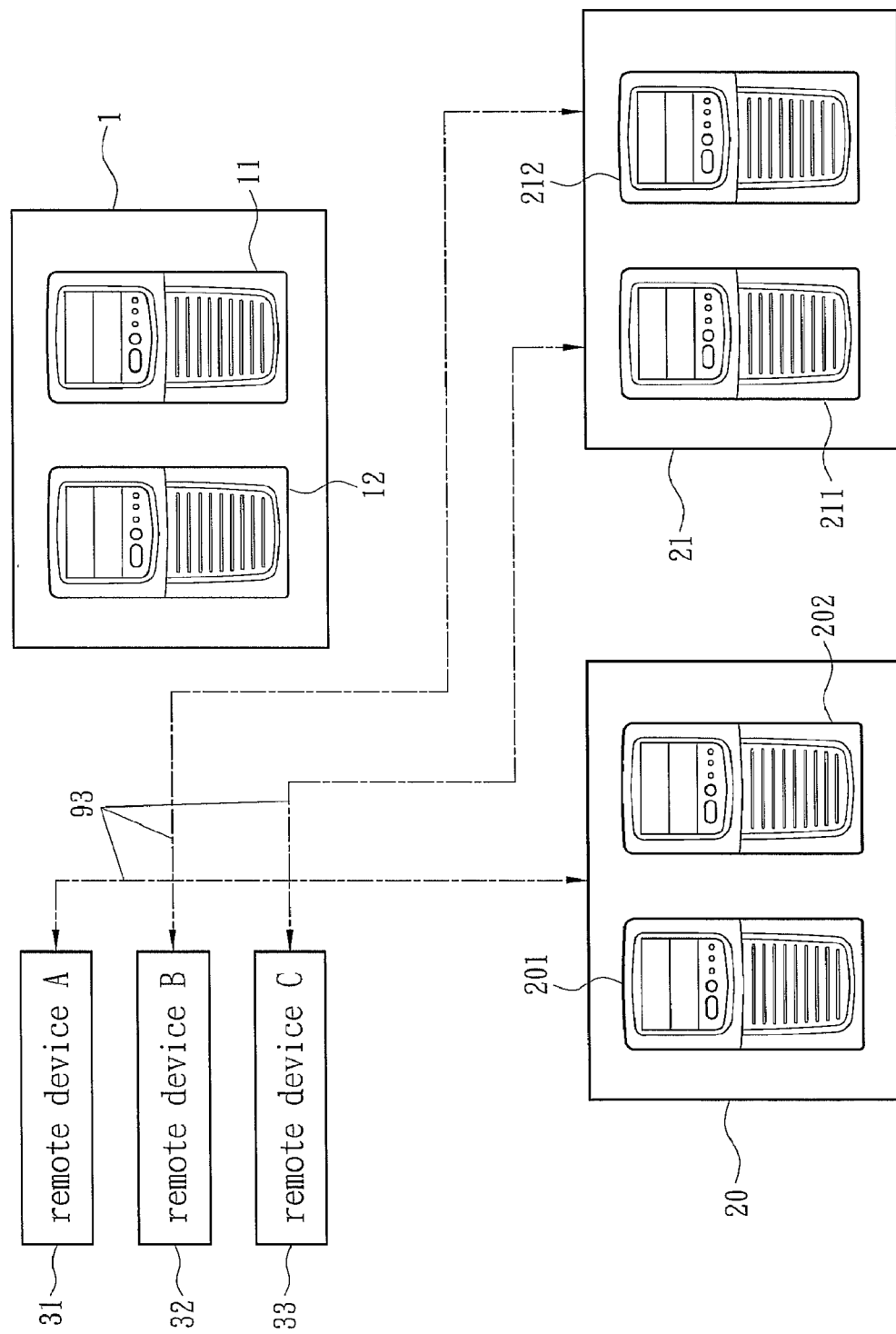
FIG. 2 is a second diagram schematically showing the architecture of a remote information communication system according to the first embodiment of the present invention.

Refer to FIG. 2. According to the linking address the administration server group 1 responds to the remote device A (31), the remote device A (31) links to the linking server group A (20) and registers the information thereof in the linking server group A (20), whereby the linking server group A (20) learns IP of the remote device A (31). According to the linking address the administration server group 1 responds to the remote device B (32) and the remote device C (33), the remote device B (32) and the remote device C (33) link to the linking server group B (21) and registers the information thereof in the linking server group B (21) whereby the linking server group B (21) learns IPs of the remote device B (32) and the remote device C (33).

Figure 3:
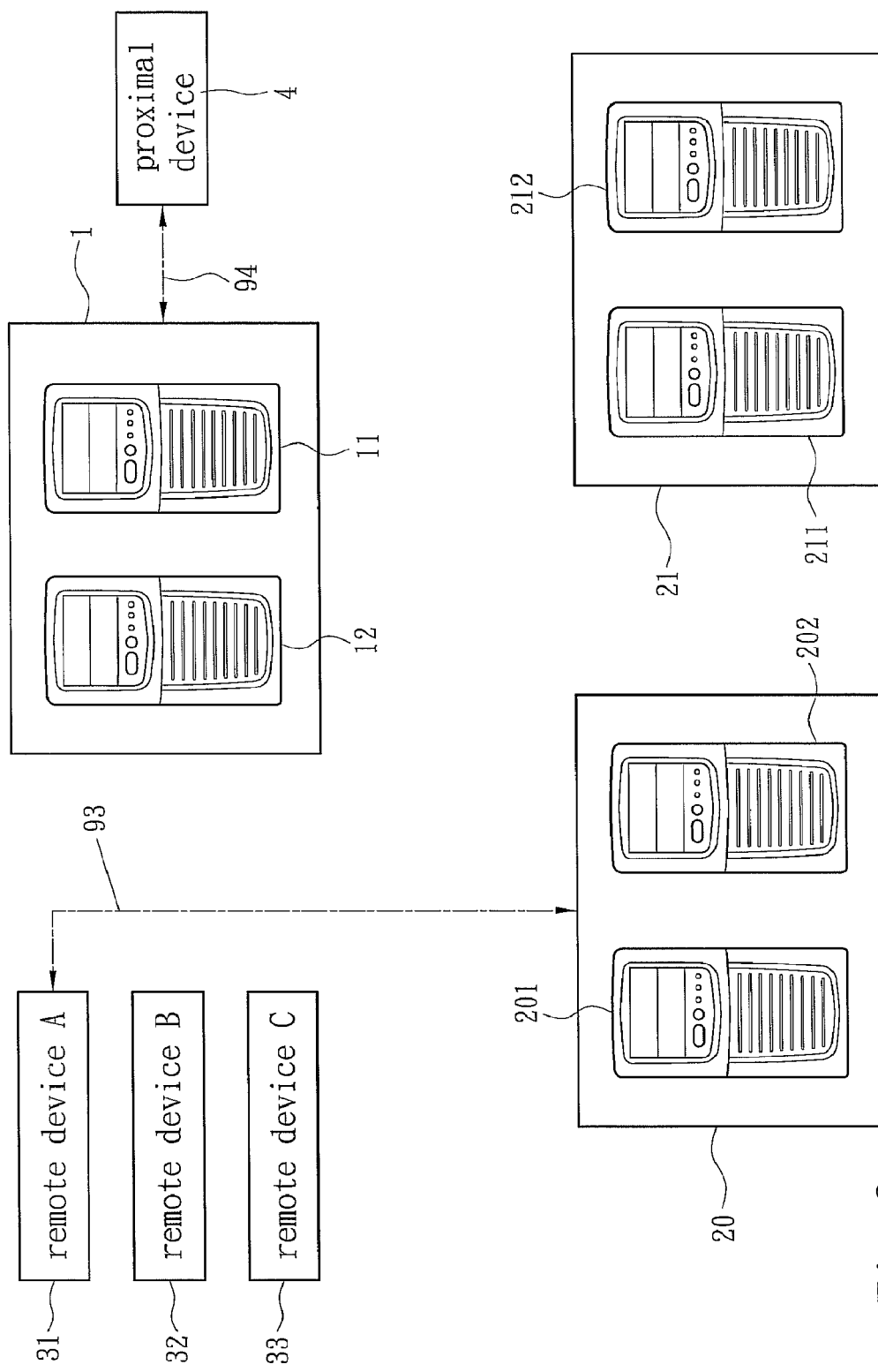
FIG. 3 is a third diagram schematically showing the architecture of a remote information communication system according to the first embodiment of the present invention.
Figure 4:
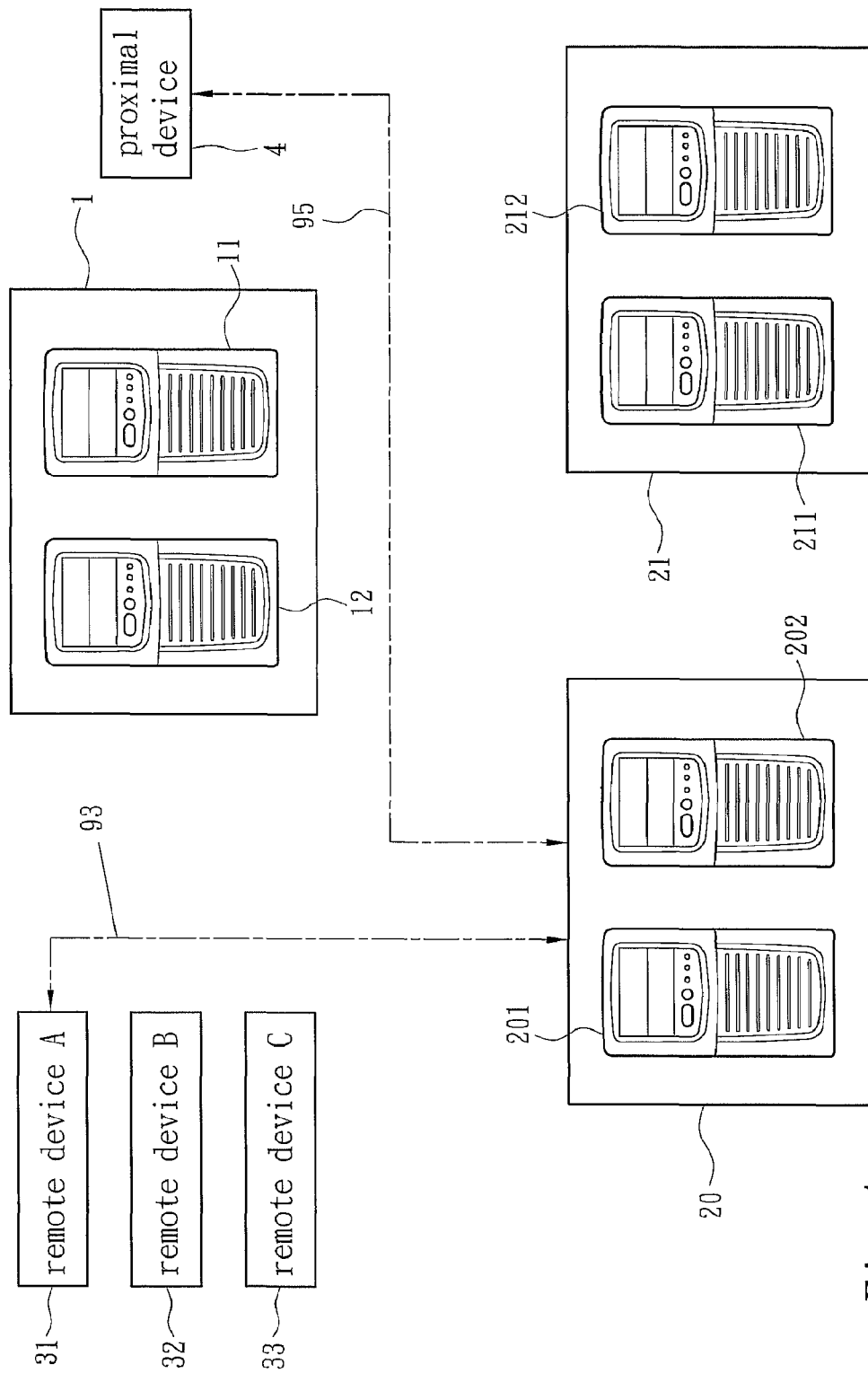
FIG. 4 is a fourth diagram schematically showing the architecture of a remote information communication system according to the first embodiment of the present invention.
Figure 5:
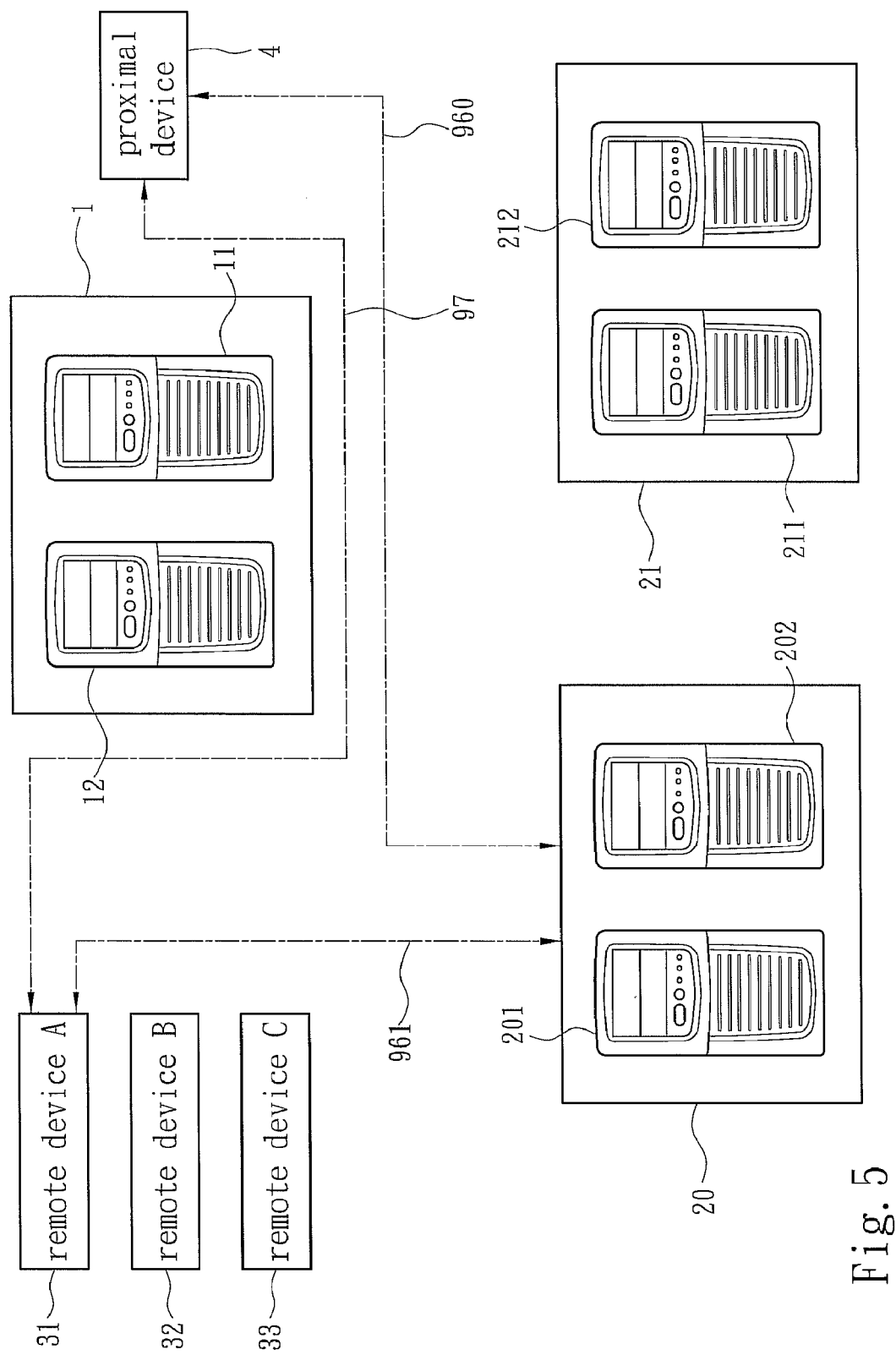
FIG. 5 is a fifth diagram schematically showing the architecture of a remote information communication system according to the first embodiment of the present invention.
Figure 6:
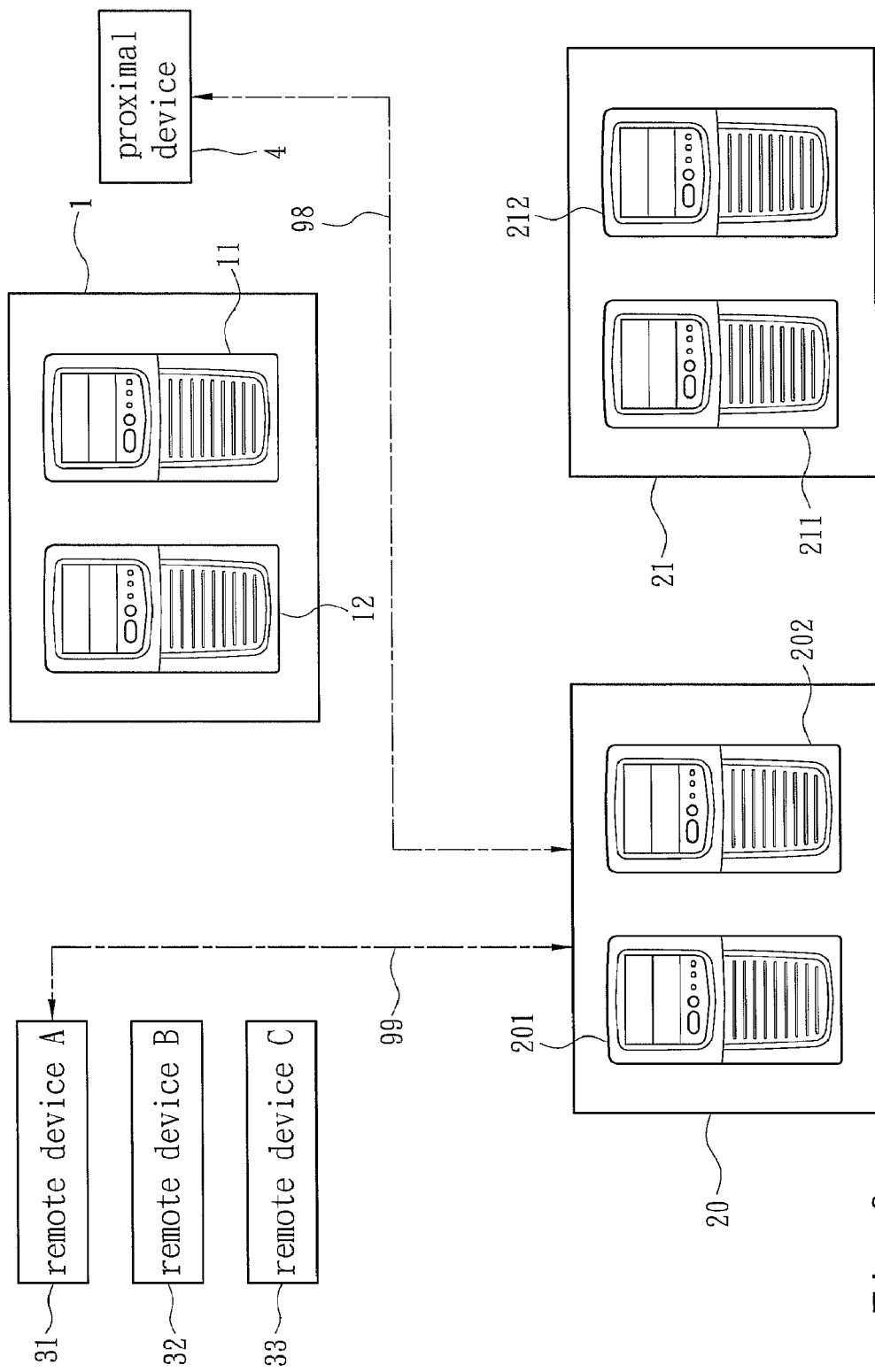
FIG. 6 is a sixth diagram schematically showing the architecture of a remote information communication system according to the first embodiment of the present invention.

Refer to FIG. 3. The remote information communication system of the present invention can accept one or more proximal devices 4 linked thereto. The proximal devices 4 need API (Application Programming Interface) supporting the linking to the administration server group 1. The proximal device 4 can select a specified remote device via API. Suppose that the proximal device 4 chooses the remote device A (31) as the linked target via API. The proximal device 4 sends a linked target requesting information 94 to the administration server group 1 via API to ask which linking server group can link the proximal device 4 to the remote device A (31). The administration server group 1 provides the location of the linking server group A (20) that the specified remote device A (31) registers. Via API, the proximal server 4 links to the linking server group A (20) according to the location that the administration server group 1 responds to the proximal device 4. Then, the proximal device 4 sends link requesting information 95 to the linking server group A (20) for being linked to the remote device A (31). Refer to FIG. 5. The linking server group A (20) takes priority to use the hole punching technology and respectively sends hole-punching information 960 and hole-punching information 961 to the proximal device 4 and the remote device A (31) so as to establish a P2P link 97 between the proximal device 4 and the specified remote device A (31). The proximal device 4 can obtain the information of the remote device A (31) or control the remote device A (31) via the P2P link 97. Refer to a U.S. publication No. 2009/0100309 and a GB publication No. 2475279 for the hole punching technology. As the hole punching technology is not a technical feature of the present invention but a prior art, it does not repeat herein. Refer to FIG. 6. If the linking server group A (20) does not complete the hole punching process, the linking server group A (20) forwards data packets between the proximal device 4 and the specified remote device A (31).

The proximal device 4 cannot obtain the IPs of the linking server group A (20) and the linking server group B (21) unless via the administration server group 1. Therefore, the variation of IP or mechanical specification of the linking server group A (20) and the linking server group B (21) would not hinder the proximal device 4 from finding a linked target. Favored by the abovementioned feature, the architecture of the linking server group (such as quantity, specification, type, etc.) can be modified according to the market requirement. For example, when some type of products increases on line, the linking servers supporting the type of products can be increased to meet the load capacity required by the type of products. When new linking server groups are added, or when the linking information (such as IP) is varied, or when the number of the machines inside a linking server group is varied, what needs doing is only renewing the server list and making the linking server group send the server-register information 92 to register in the administration server group 1 again. When the number or type of the remote devices is varied or when the linking server group that the remote device registers is varied, the device list has to be updated and the remote device has to request the linking server groups with the information of the linking server groups.

Figure 7:
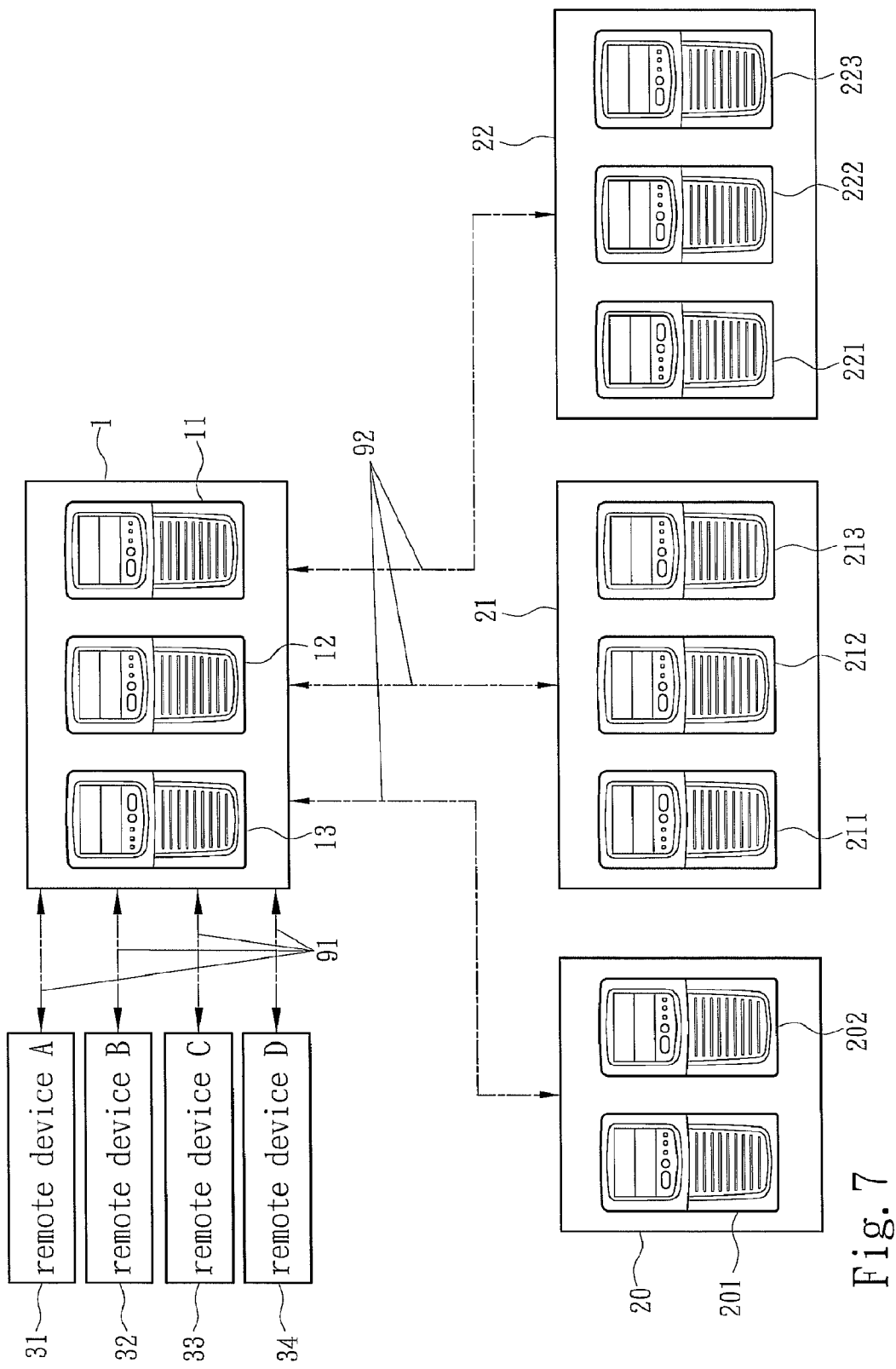
FIG. 7 is a seventh diagram schematically showing the architecture of a remote information communication system according to the first embodiment of the present invention.

Refer to FIG. 7 a diagram schematically an embodiment of expanding the remote information communication system. In this embodiment, a remote device D (34) is added to the system. In the present invention, the number or addresses of the supported remote devices can be varied via renewing the device list of the administration server group 1. The remote devices A-D (31-34) can ask and learn new available linking server groups via sending the linking server requesting information 91 to the administration server group 1 again. As shown in FIG. 7, a new linking server 213 is added to the linking server group B (21), and a new linking server group C (22) consisting of linking servers 221, 222 and 223 is added to the system. Similarly, the content of the linking servers of the remote information communication system is expanded via renewing the server list of the administration server group 1 in this embodiment. In the present invention, the quantities, specifications and types of the remote devices or linking servers can be expanded or varied according to requirement via only renewing the server list or device list and registering in the administration server group 1 once more. Thereby, the manufacturers can easily vary the load capacity of the system according to requirement.

Figure 8:
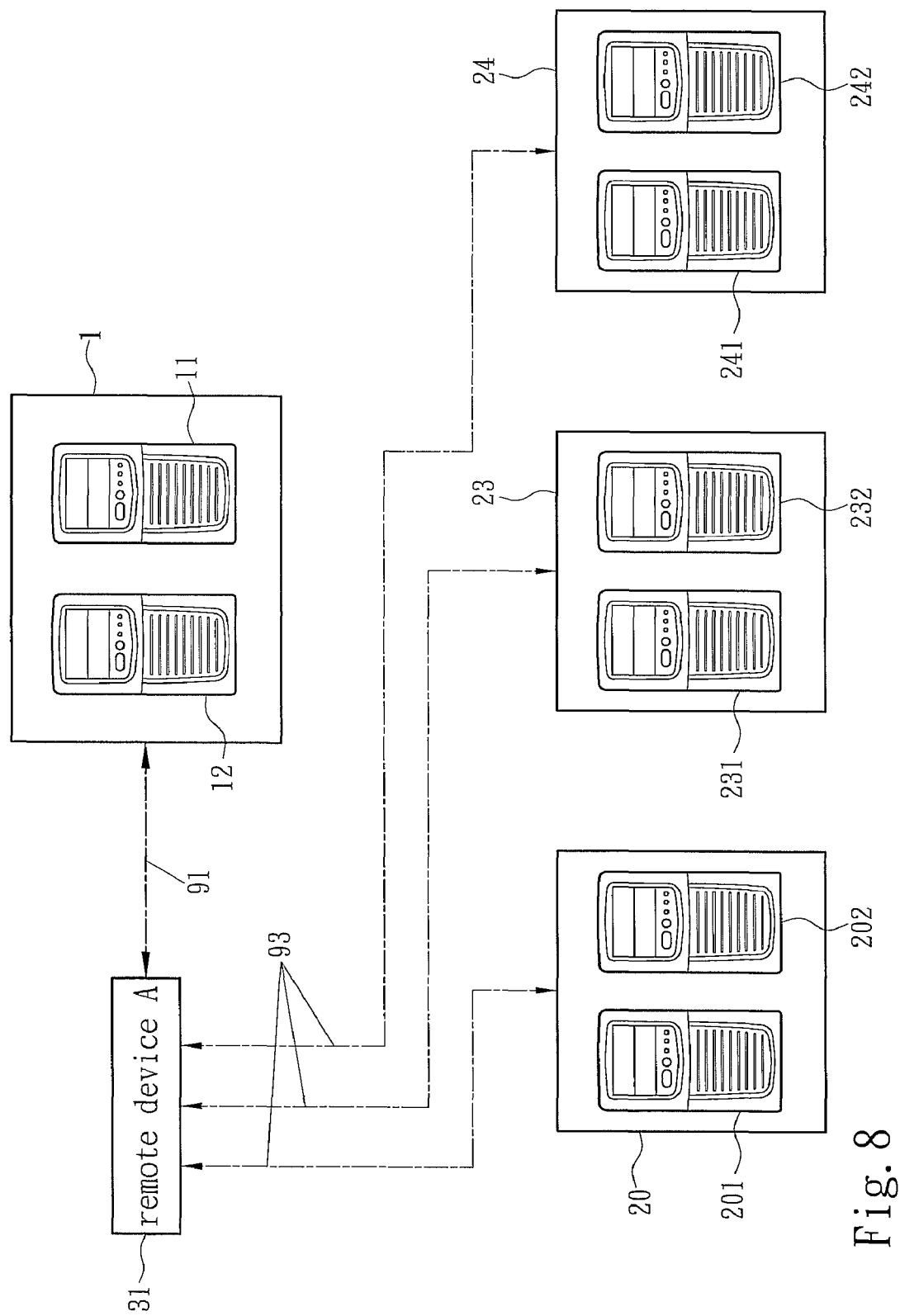
FIG. 8 schematically shows that a remote device registers in a plurality of linking server groups according to one embodiment of the present invention.

The remote information communication system of the present invention allows an identical remote device to register in several different linking servers. As shown in FIG. 8, the remote information communication system includes the linking server groups A, D and E (20, 23, and 24). The linking server group D (23) includes linking servers 231 and 232. The linking server group E (24) includes linking servers 241 and 242. After the remote device A (31) sends the linking server requesting information 91 to the administration server group 1, the administration server group 1 responds to the remote device A (31) that it can register in the server groups A, D and E (20, 23, and 24). Favored by the feature, the server groups A, D and E (20, 23, and 24) can jointly support the remote device A (31). When the linking server group A (20) is out of order or off-line, the remote device A (31) can still register in the linking server group D (23) or the linking server group E (24). Further, if the remote device A (31) is a mobile one, the administration server group 1 may assign the remote device A (31) to a linking server group nearest to the remote device A (31).

The mapping relationship between the remote devices and the linking server groups is shown in Table. 1.

TABLE 1 the mapping relationship between the remote devices and the linking server groups

| | Codes of Linking Servers | Serial Numbers of Remote Devices | Notes |
|---|---|---|---|
| Service Provider A | Ser 01 | D01, D02, D03, D04, D05 | Ser 01: Shanghai |
| | Ser 02 | | Ser 02: Tokyo |
| | Ser 03 | | Ser 03: Los Angeles |
| | Ser 04 | D06, D07, D08, D09 | Ser 04: New York |
| | Ser 05 | | Ser 05: Berlin |
| Service Provider B | Ser 11 | D11, D12, D13, D14 | Ser 11: Paris |
| | Ser 12 | | Ser 12: Cairo |

In the example shown in Table. 1, the server list of the administration server stores the linking servers Ser 01-Ser 05 managed by Service Provider A and the linking servers Ser 11-Ser 12 managed by Service Provider B. Remote devices D01-D05 are assigned to register in the linking servers Ser 01-Ser 03. D01-D05 are respectively the serial numbers of remote devices. As mentioned above, each remote device has a unique serial number, whereby the administration server or the linking server can verify or recognize the remote device. Requested by proximal devices, the linking servers Ser 01-Ser 03 establish links between the proximal devices and the remote devices D01-D05. As the linking servers Ser 01-Ser 03 have identical functions, they can back up with each other. The linking servers Ser 01-Ser 03 can be respectively arranged in different geographic locations. For example, the linking servers Ser 01-Ser 03 are respectively located in Shanghai, Tokyo and Los Angeles, whereby the remote devices D01-D05 can register in the nearer linking servers. Similarly, remote devices D06-D09 are assigned to register in the linking servers Ser 04-Ser 05. Remote devices D11-D14 are assigned to register in the linking servers Ser 11-Ser 12 managed by Service Provider B. When the remote device D01 accesses the Internet to ask the administration server a linking server, the administration server can simultaneously provide the addresses of the linking servers Ser 01-Ser 05 for the remote device D01, whereby the remote device D01 can find a normal linking server anytime.

In the remote information communication system, the linking server groups back up with each other. Moreover, there are a plurality of linking servers in one linking server group, thus the present invention is formed in a multi-backup structure. Therefore, the present invention is very stable and still operates well even when there are few malfunctions occurring.

Figure 9:
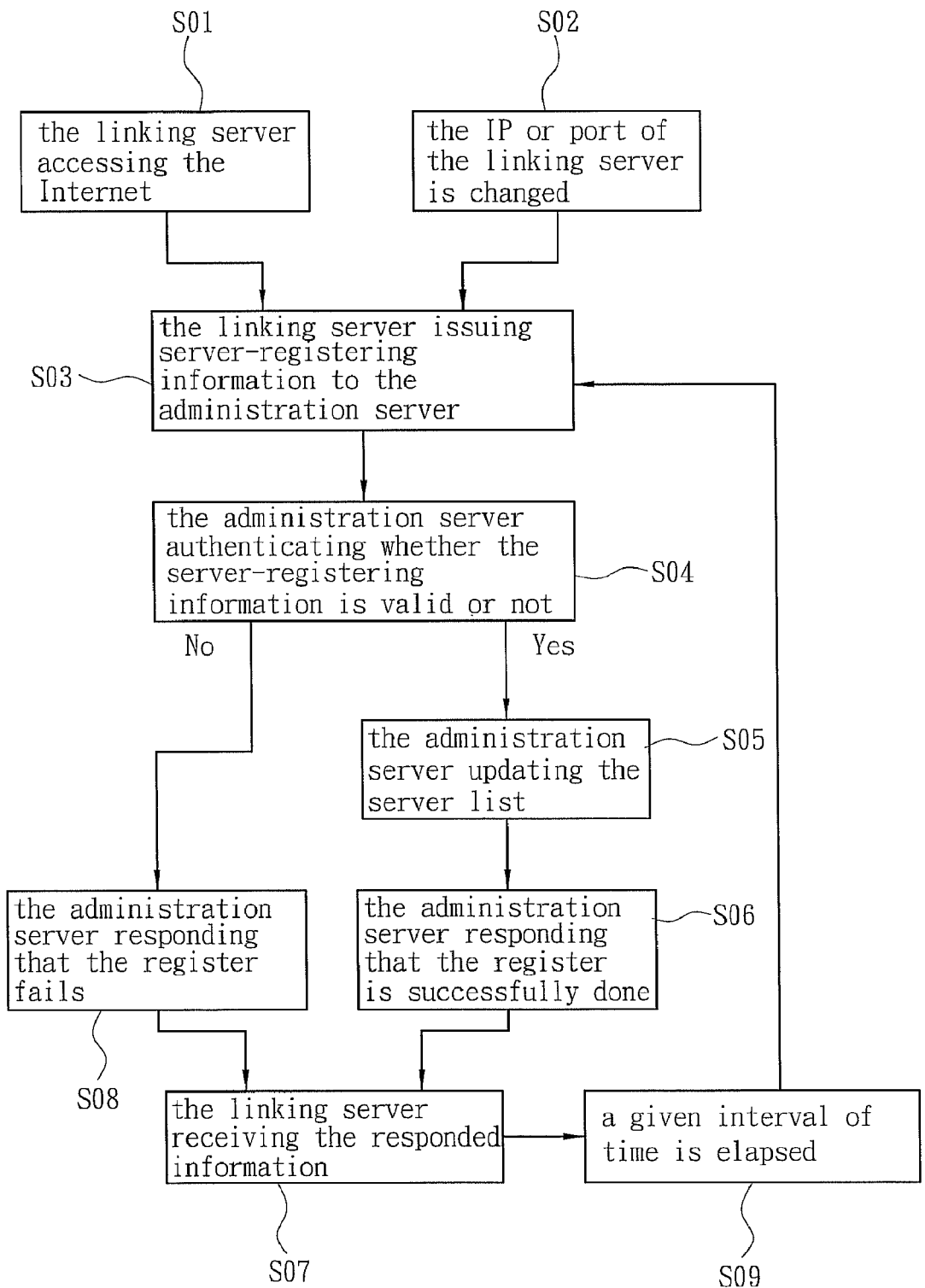
FIG. 9 shows a flowchart of the connection and interaction of a linking server and an administration server according to one embodiment of the present invention.

Refer to FIG. 9 showing a flowchart of the operation of the linking servers and the administration server. When one or more linking servers access the Internet (Step S01) or when the IPs or ports of one or more linking servers are varied (Step S02), the linking server connects with the administration server via the Internet and transmits a piece of server-registering information to the administration server (Step S03). The administration server verifies the server-registering information and determines whether the linking server is legal in the server list (Step S04). If the linking server is determined to be legal in the server list, the administration server renews the server list according to the server-registering information (Step S05) and acknowledges the linking server that the register is done (Step S06). Thus, the linking server receives the acknowledge (Step S07). In order to guarantee that the administration server records the latest status of the linking server group, Step S03 is executed periodically (Step S09). If the register is unsuccessful in Step S04, it means that linking server does not exist in the server list and is an illegal linking server. In such a case, the administration server acknowledges the linking server that register fails (Step S08), and the linking server receives the acknowledge (Step S07).

Figure 10:
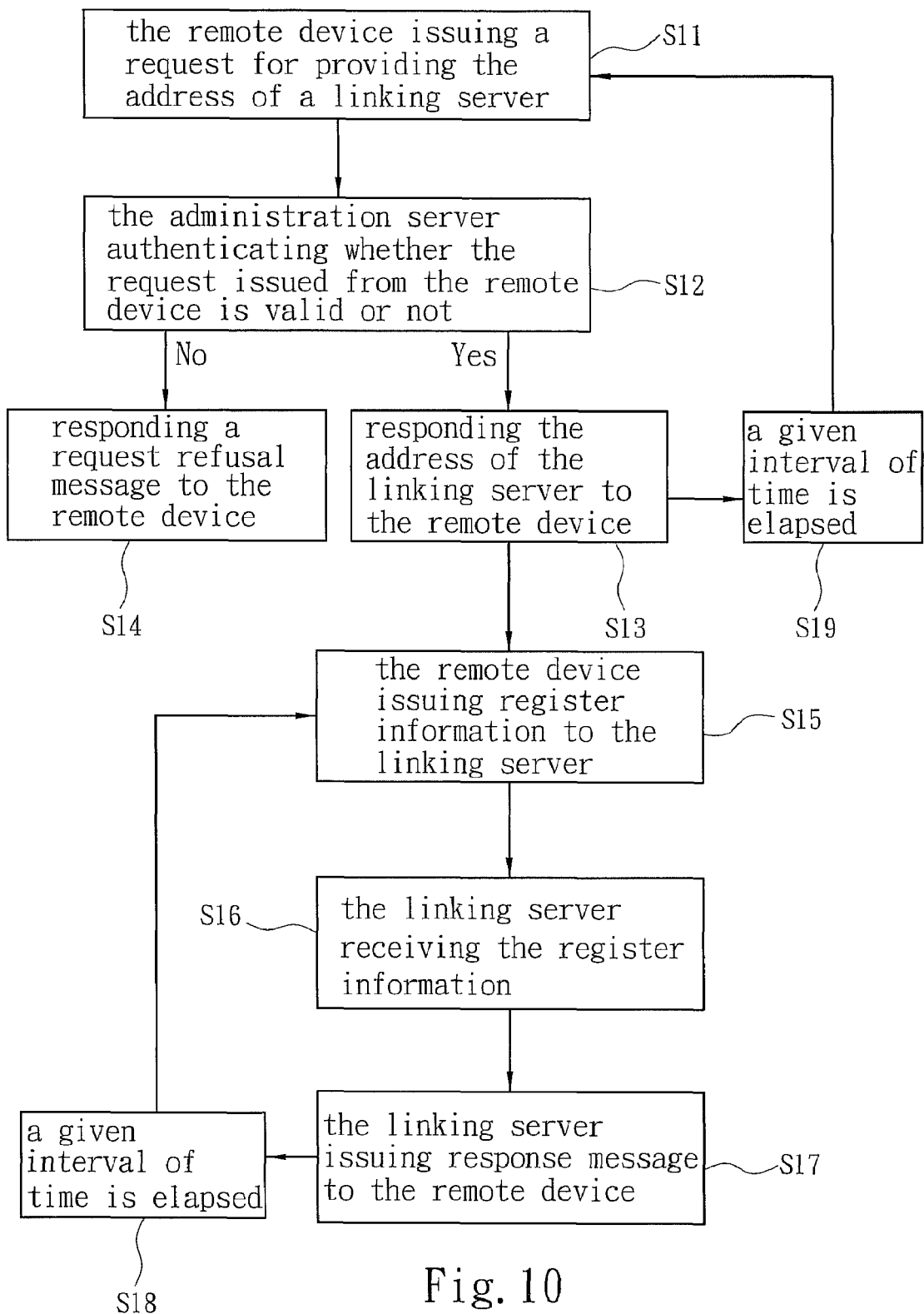
FIG. 10 shows a flowchart of the connection and interaction of a remote device and a linking server according to one embodiment of the present invention.

Refer to FIG. 10 showing a flowchart of the process that a remote device accesses the Internet to ask the administration server to provide linking servers. Firstly, the remote device sends a request to the administration server for providing the address of a linking server (Step S11). Next, the administration server examines whether the request is valid (Step S12). If the request is valid, the administration server responds to the remote device the addresses of the linking servers (Step S13). If the request is invalid, the administration server responds to the remote device a refusal message (Step S14). Next, the remote device connects with the linking server provided by the administration server. The remote device sends a piece of device-registering information to the linking server (Step S15), and the linking server receives the device-registering information (Step S16). Next, the linking server sends a response to the remote device (Step S17). Thus, the linking server learns the IP and information necessary for communicating with the remote device. To guarantee that the linking server can access the remote device, the remote device returns to Step S11 periodically to resend the information thereof to the linking server (Step S18). The period may be preset to be 10 minutes. Thereby, the linking server can frequently learn the latest status of the remote device. By a longer period, the remote device periodically requests the administration server to provide the latest addresses and related information of the linking servers (Step S19). The longer period may be preset to be 24 hours.

Figure 11:
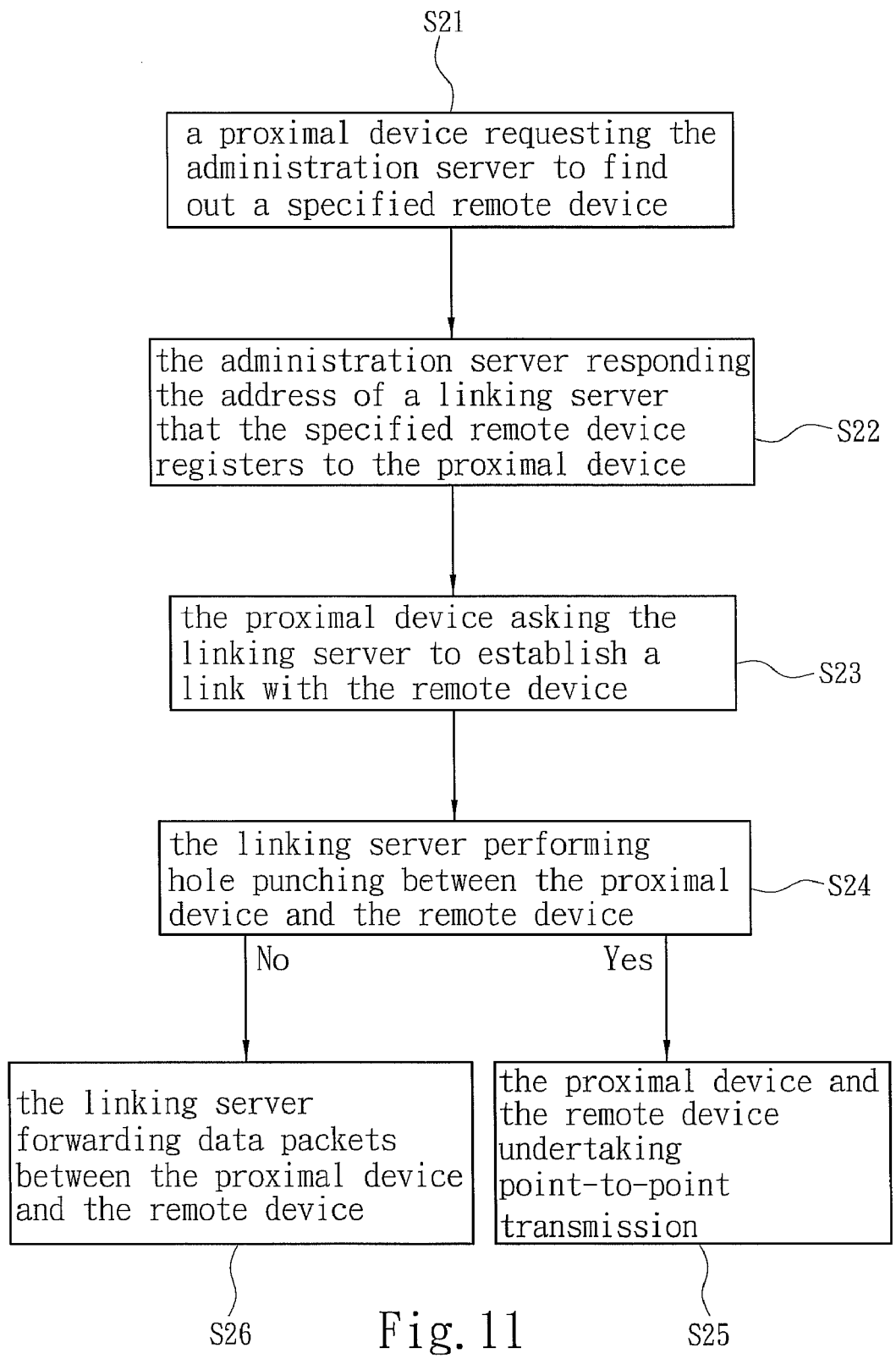
FIG. 11 shows a flowchart of the connection and interaction of a proximal device and a remote device according to one embodiment of the present invention.

Refer to FIG. 11 showing a flowchart of the process that the user uses a proximal device to ask for connecting with a remote device. The user uses API of a proximal device to select a specified remote device. Then, the proximal device requests the administration sever to find out the specified remote device via API (Step S21). The administration server responds to the proximal device with the address of a linking server that the remote device registers (Step S22). Thus, the proximal device learns the linking server whereby it can connects with the specified remote device. Next, the proximal device asks the linking server to establish a link between the proximal device and the remote device (Step S23). The linking server takes priority to perform a hole punching process on the proximal device and the remote device (Step S24). If the hole punching process is successful, the proximal device and the remote device undertake P2P transmission (Step S25). If the hole punching process fails, the linking server forwards data packets between the proximal device and the remote device (Step S26).

Via the technique set forth above, the remote device and the linking server needn't directly disclose the IPs and domain names thereof. Therefore, the present invention can reduce the risk of hacker invasion. Further, the proximal device can merely use the administration server to find out a linking server that a specified remote device registers, neither needing a fixed IP nor remembering the IP addresses or domain names of the linking servers. As long as a proximal device has an API supported by the administration server, the user can merely select a remote device to request the administration server to find out the linking address. The remaining procedures, such as interactions with the administration server and the linking server, are all automatically executed by API. Therefore, the present invention can greatly reduce complexity of operation. Furthermore, the present invention allows the manufacturers to vary the quantities, specifications and types of the remote devices and the linking servers as long as the manufacturers log in the administration server and update the device list and the server list. Therefore, the manufacturers can vary the quantities, specifications and types of the remote devices and the linking servers according to load of the apparatuses. In the present invention, the remote devices may be security apparatuses (such as surveillance cameras, anti-theft systems, and smoke/fire alarms) or home electric appliances (such as refrigerators and air-conditioners). In the present invention, the proximal devices should be devices having AV playing functions, such as mobile phones, computers, and personal digital assistants, which are able to play AV information.

In one embodiment, a communication system for establishing a P2P connection, wherein the communication system comprises: a networked device or service device having an identification; at least one linking server for providing connecting information to enable a terminal device or client device to establish a P2P connections between the service device and the client device, wherein the identification of service device is registered in the at least one linking server, wherein the client device communicates with the at least one link server to establish a P2P connection to the service device according to the connecting information provided by the at least one linking server, wherein the client device has not been registered into the at least one linking server when the P2P is established.

Please note that the client device is not necessary to have an identification in the first place for establishing the P2P connection, which is different from the existing technology in which a client device must have an identification and have it registered in the server in order to establish the P2P connection.

In one embodiment, the functionalities of administration server and the linking server can be integrated into a single connecting server, a service device can register its UID (Unique Identification) into the connecting server, and then a client device can communicate with the connecting server to establish a P2P connection from the client device to the service device. As long as a client device has the information of the UID of the service device, the client device can contact the connecting server to make a P2P connection to the service node and the client device itself is not necessary to have its own UID at all. The number of servers needed depends on the scale of the network for serving the client and service devices.

In one embodiment, in addition to the administration server group and the linking server group, a backend management server group can be added to report any failure of the administration servers and/or the linking servers and to perform load balancing among administration servers and/or the linking servers. For example, if one of the administration servers fails, the backend management server can detect such scenario and redirect all the requests destined to the failed administration server to another administration server. Likewise, if one of the administration servers or linking server is overloaded, the backend management server can detect such scenario and redirect a portion of the requests destined to an overloaded server to another server for load balancing.

Figure 12:
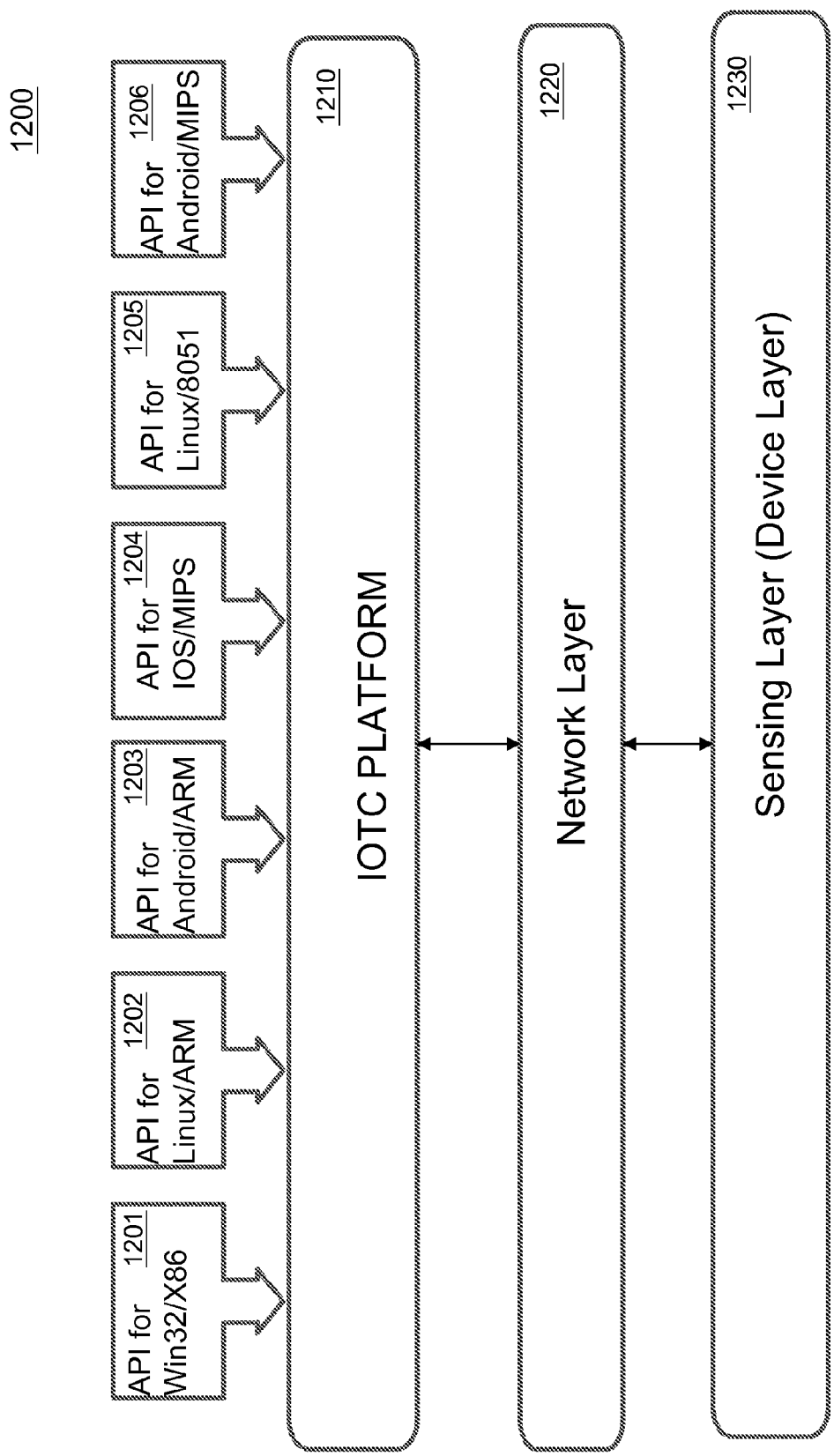
FIG. 12 illustrates the architecture of IOTC (Internet of Things Cross-platform) in accordance with one embodiment of present invention.

In one embodiment, API modules can be integrated into many different platforms. FIG. 12 illustrates the architecture of the IOTC (Internet of Things Cross-platform) 1200 in accordance with one embodiment of present invention. An application layer requests P2P service through an API (application programming interface) 1201, 1202, 1203, 1204, 1205, 1206 for establishing P2P connections through IOTC platform 1210, thereby providing an uniform and integrated solution across platforms with different processors, such as ARM, X86, MIPS, etc., or operating systems, such as Windows, Linux, IOS, Android, etc. Furthermore, a networking layer is provided to communicate with another IOTC platform; and a sensing layer or a device layer for connecting to other devices such as IP cam, RFID, etc.

As integrated circuit technology advances rapidly, more and more design can be integrated into one IC. By doing so, it not only saves cost but also enables plug and play for connecting devices through P2P connections. FIG. 13A illustrates a block diagram of an integrated circuit 1300 in accordance with one embodiment of present invention. The integrated circuit 1300, comprises: a CPU 1301 or a processor; and IOTC API modules 1303, for establishing a connection to a pre-specified remote device, wherein the IOTC API modules 1303 comprise instructions, when executed by the processor, to request an administration server to provide addressing information of a linking server in which the pre-specified remote device is registered, wherein the IOTC API modules 1303 request the linking server to establish a P2P connection between the integrated circuit and the pre-specified remote device, according to the addressing information of the linking server provided by the administration server.

Figure 13B:
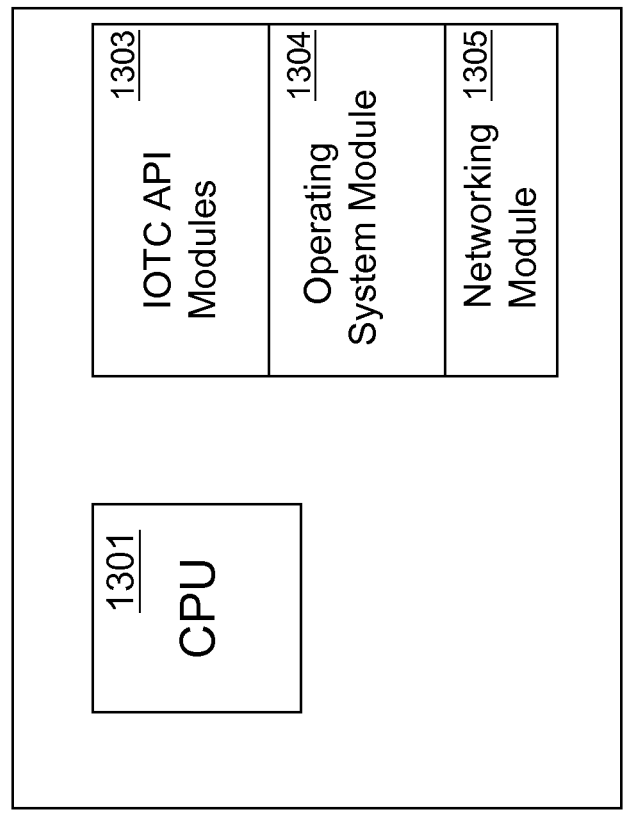

In one embodiment, as shown in FIG. 13B, the integrated circuit 1350 has IOTC API modules 1303, an operating system module 1304 and a networking module 1305.

Figure 13C:
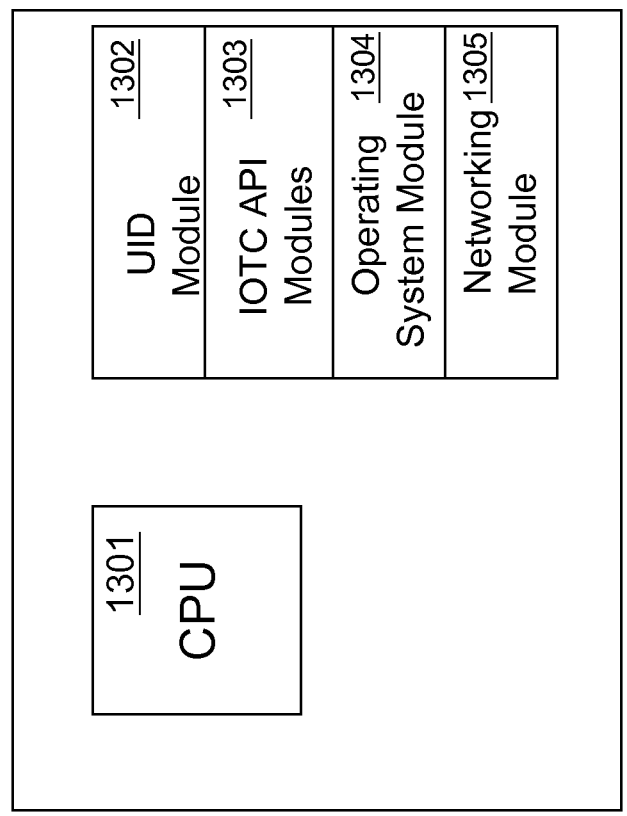

In one embodiment, as shown in FIG. 13C, the integrated circuit 1360 has a UID (Unique Identification) module 1302, IOTC API modules 1303, an operating system module 1304 and a networking module 1305. The UID module 1302 performs a registration process to register an electronic device encompassing the integrated circuit 1360 into administration and linking servers so that other devices can establish P2P connections with the electronic device.

Figure 13D:
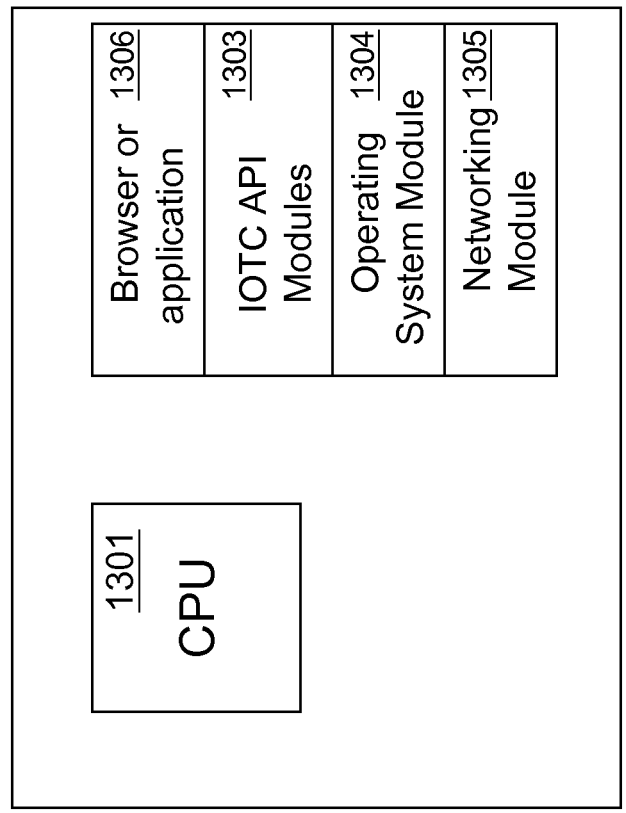

In one embodiment, as shown in FIG. 13D, the integrated circuit 1370 has a browser or an application module 1306, IOTC API modules 1303, an operating system module 1304 and a networking module 1305. The browser or application module 1306 can establish P2P connections with a remote device through the API modules.

Please note that API modules, operating system module, networking module or CPU can be packaged in an electronic device such as an IP camera, a mobile phone or a storage device. That is, the CPU and API modules can be packaged into two or more integrated circuits as well. The above description for the integrated circuit can be used for an electronic device as well; therefore it is not further described herein.

Figure 14A:
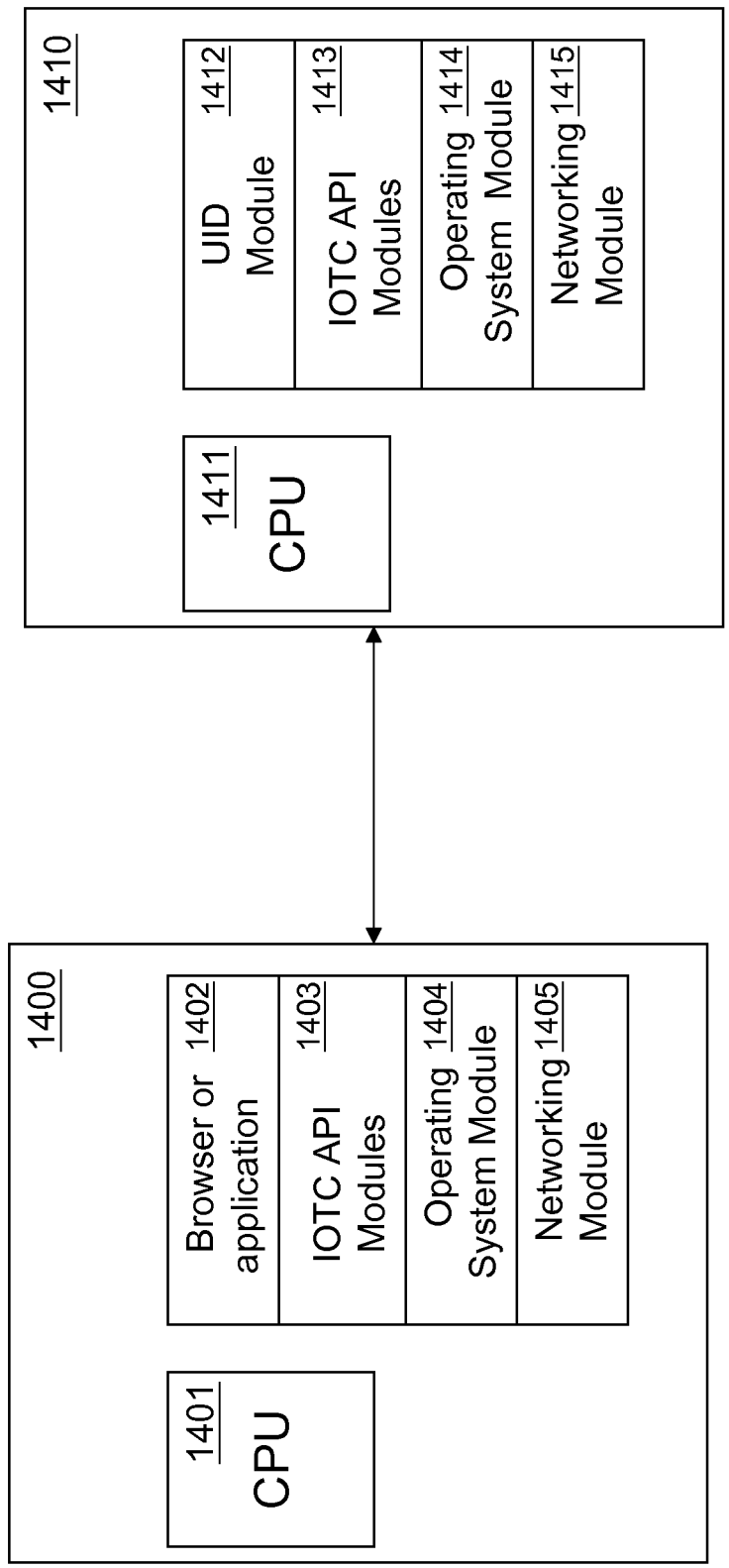
FIG. 14A-14B illustrates a block diagram of two connected devices when a P2P connection is established in accordance with one embodiment of present invention.

FIG. 14A illustrates a block diagram of two connected devices when a P2P connection is established by an administration server and a linking server, wherein one of the two connected devices is a client device 1400, and the other one is a remote service device 1410. The client device 1400 can be integrated into an integrated circuit (IC) or packaged into an electronic device; and the remote service device 1410 can be integrated into an integrated circuit (IC) or packaged into an electronic device. As shown in FIG. 14A, the remote service device 1410 has a CPU 1411, a UID (Unique Identification) module 1412, IOTC API modules 1413, an operating system module 1414 and a networking module 1415. The UID module 1412 performs a registration process to register the remote service device 1410 into administration and linking servers so that the client device 1400 can establish P2P connections with the remote service device 1410. The client device 1400 has a CPU 1401, a browser or an application module 1402, IOTC API modules 1403, an operating system module 1404 and a networking module 1405. The browser or application module 1402 can establish P2P connections with the remote service device 1410 through the API module.

As described in the U.S. provisional application 61/812,262 to which the instant application claims the benefit, an image sensor can be used to generate an image of a pattern, such as a one dimensional Bar Code or a QR code, for inputting identification information for a terminal equipment, a client device, a networking equipment or an electronic device, so that the inputted identification information can be used to establish P2P connections. Please note that a proxy device such as a mobile phone can input identification information for other terminal equipment or electronic devices through an input device of the proxy mobile phone, such as an image sensor, a keyboard, touch screen, etc.

Figure 14B:
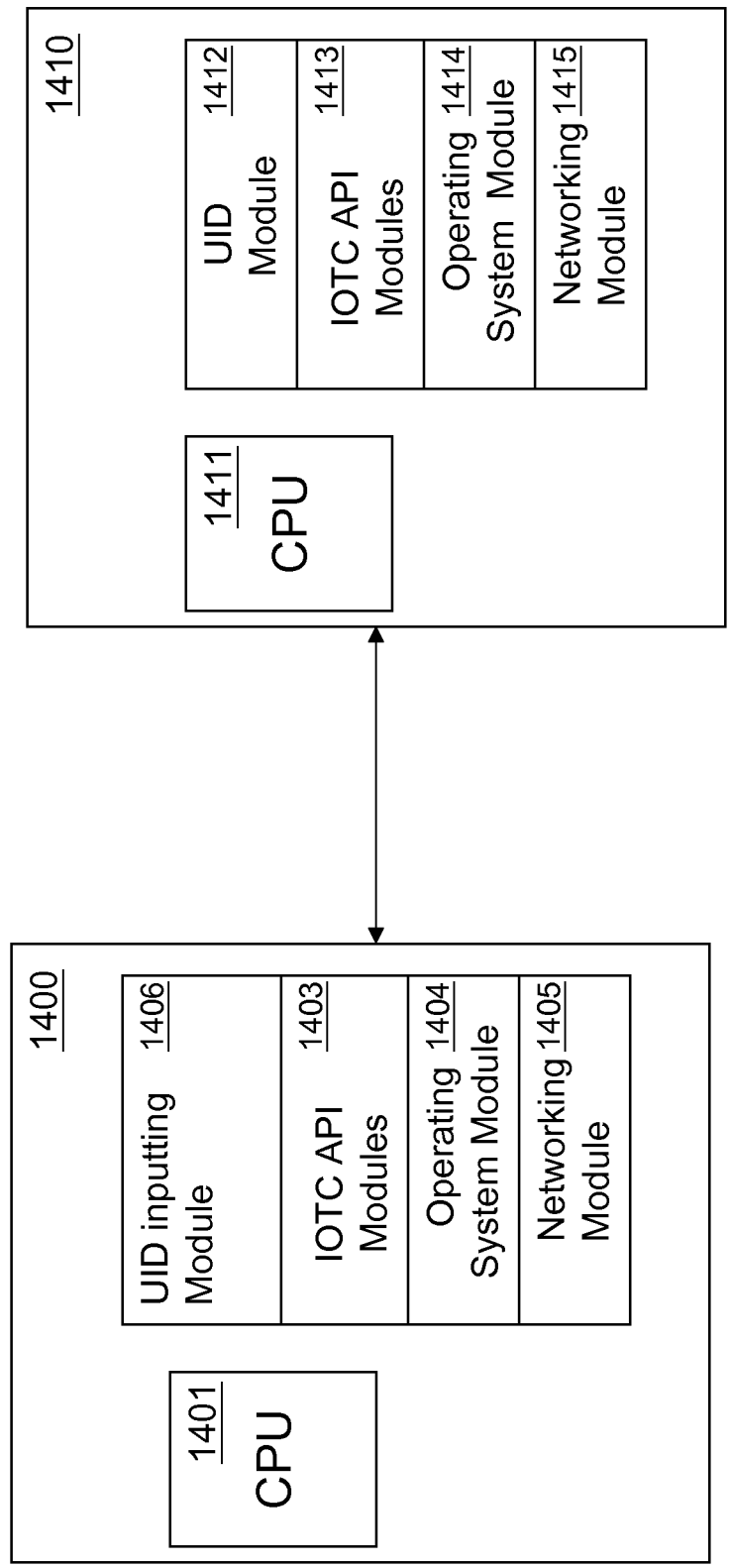

In one embodiment, FIG. 14B illustrates a block diagram of two connected devices when a P2P connection is established by an administration server and a linking server, wherein one of the two connected devices is a client device 1400, and the other one is a service device 1410. As shown in FIG. 14B, the service device 1410 has a CPU 1411, a UID (Unique Identification) module 1412, IOTC API modules 1413, an operating system module 1414 and a networking module 1415. The UID module 1412 performs a registration process to register the service device 1410 into administration and linking servers, so that the client device 1400 can establish a P2P connection with the service device 1410. The UID module 1412 inputs an image of a pattern, such as a one dimensional Bar Code or a QR code, for inputting identification information of the service device 1410, so that the registration process can use the inputted identification information to register the service device 1410 into the administration and linking servers. The client device 1400 has a CPU 1401, a UID inputting module 1406 to input the identification information of a service device, IOTC API modules 1403, an operating system module 1404 and a networking module 1405. For example, the UID inputting module 1406 inputs the identification information of the service device 1410 in order to establish a P2P connection with the service device 1410 through the IOTC API modules 1403.

Figure 15:
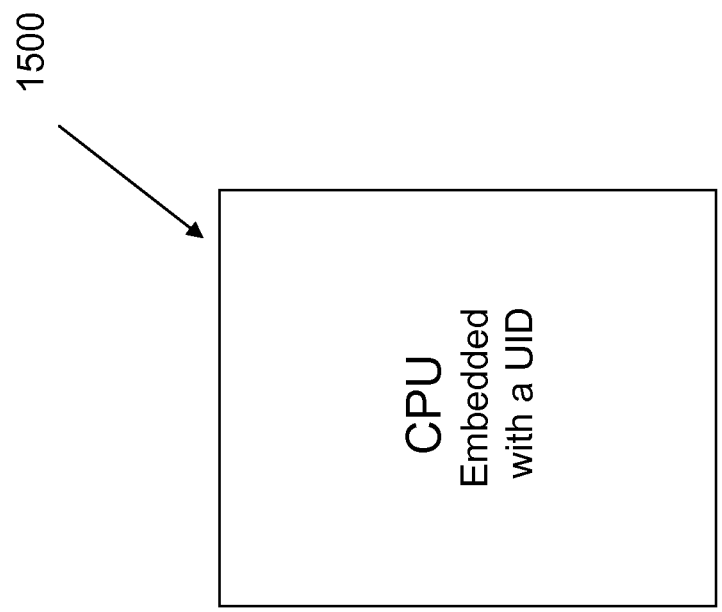
FIG. 15 illustrates a processor for establishing a P2P connection in accordance with one embodiment of present invention.

In one embodiment, the UID is embedded in a processor, wherein the UID can be stored in a non-volatile memory such as a flash memory or EEPROM. The UID will be programmed and tested after the processor is fabricated so that it can be readily used for P2P applications. As shown in FIG. 15, a processor 1500 is integrated with a UID which can be programmed while the processor 1500 is under test after the processor 1500 is fabricated. The advantage of such processor 1500 is that it can reduce efforts for system house to program the UID in a board level or system level environment, because it requires a complicated setup in board level or system level design to program the UID. Furthermore, it does not require an extra flash or EEPOM to store the UID, which can save cost and board space. In addition, the a portion of pins of the processor 1500 can be shared for programming the identification into the processor 1500 so that once the identification is programmed into the processor 1500, those shared pins will be dedicated for other purposes. For example, the processor 1500 can have a multiplexer to direct those shared pins to the internal flash memory of the processor 1500 for programming the identification code to the processor 1500 and to another block of the processor 1500 for normal operations.

Figure 16:
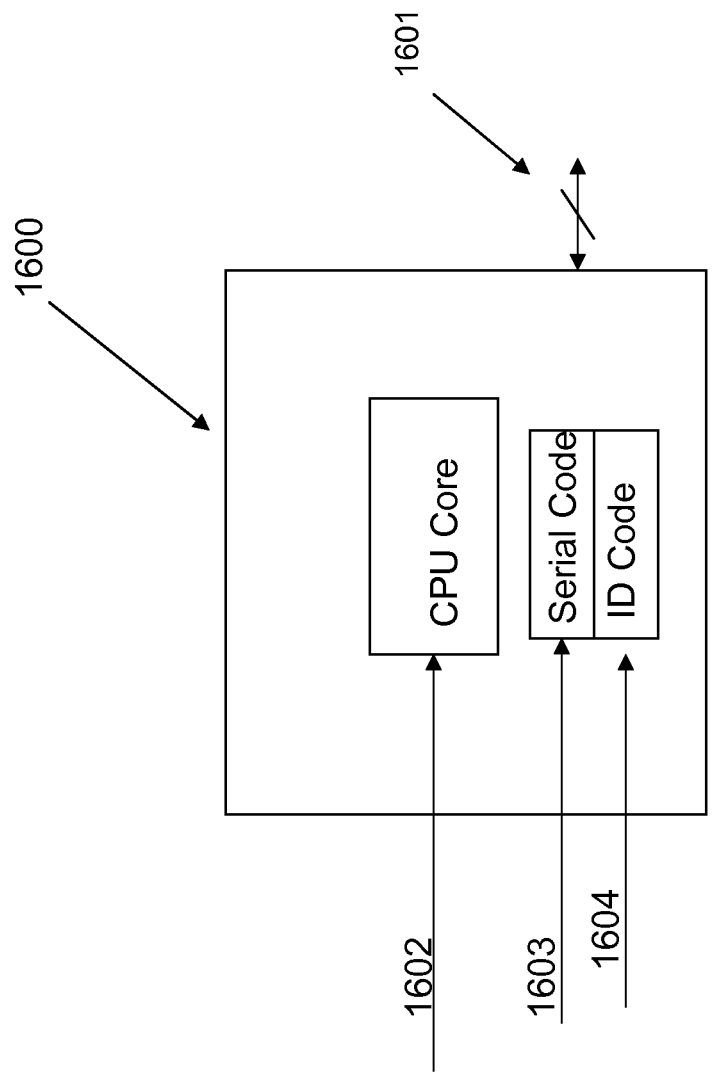
FIG. 16 illustrates a processor for establishing a P2P connection in accordance with another embodiment of present invention.

In one embodiment, as shown in FIG. 16, each processor 1600 has a CPU core 1602; a serial code 1603 to identify the processor 1600; and the identification code 1604 for establishing a P2P connection is associated with the serial code. In one embodiment, the serial code of the CPU comprises the identification code for establishing a P2P connection. In one embodiment, the serial code of the CPU is used as the identification code for establishing a P2P connection. In one embodiment, the serial code and the identification code are programmed into the CPU at the same time.

In one embodiment, the present invention pertains to the integration of an information concentrating center with P2P technology such that a remote client device can establish a P2P connection with the information concentrating center for obtaining the services provided by the information concentrating center.

Conventionally, when a remote client device tries to connect with an information concentrating center at home through the Internet, very complex procedures including DDNS (Dynamic DNS) and port mapping are used to set up the connection from the remote client device to the information concentrating center. Nowadays, UPnP Port forwarding technology can simplify the setup of the connection from the remote client device to the information concentrating center; however, the UPnP Port forwarding technology has security concerns and operating issues when multi-level routers are present in the path from the remote client device to the information concentrating center.

Conventionally, VoD (Video on demand) technology uses centralized servers for storing the contents, such as video/audio information, so that users can consume a variety of content through the Internet at different places. However, the VoD technology has some disadvantages such as bandwidth limitation associated with the servers and high costs for implementing the centralized servers. In addition, the operators of the VoD need to pay considerable license fees for the contents. By using a P2P connection between the remote client device and the information concentrating center, users can still watch varieties of content through the Internet at different places in a distributed manner to resolve bandwidth issues associated with the centralized servers. In addition, the bandwidth and the hardware requirements are significantly lower than the VoD technology, and the cost of the bandwidth and the hardware will be paid by each user.

In order to resolve the above-mentioned connection setup issues from remote client devices to the information concentrating center through the internet, the present invention discloses a way to set up the connection from the remote client device to the information concentrating center through the internet by establishing a P2P (point to point) connection from the remote client device to the information concentrating center. By using a P2P connection between the remote client device and the information concentrating center, bidirectional communication can be established for not only accessing services such as streaming video conferences or inspecting statuses of appliances at home provided by the information concentrating center, but also for sending control information, such as switching TV channels, from the remote client device to the information concentrating center.

Figure 17:
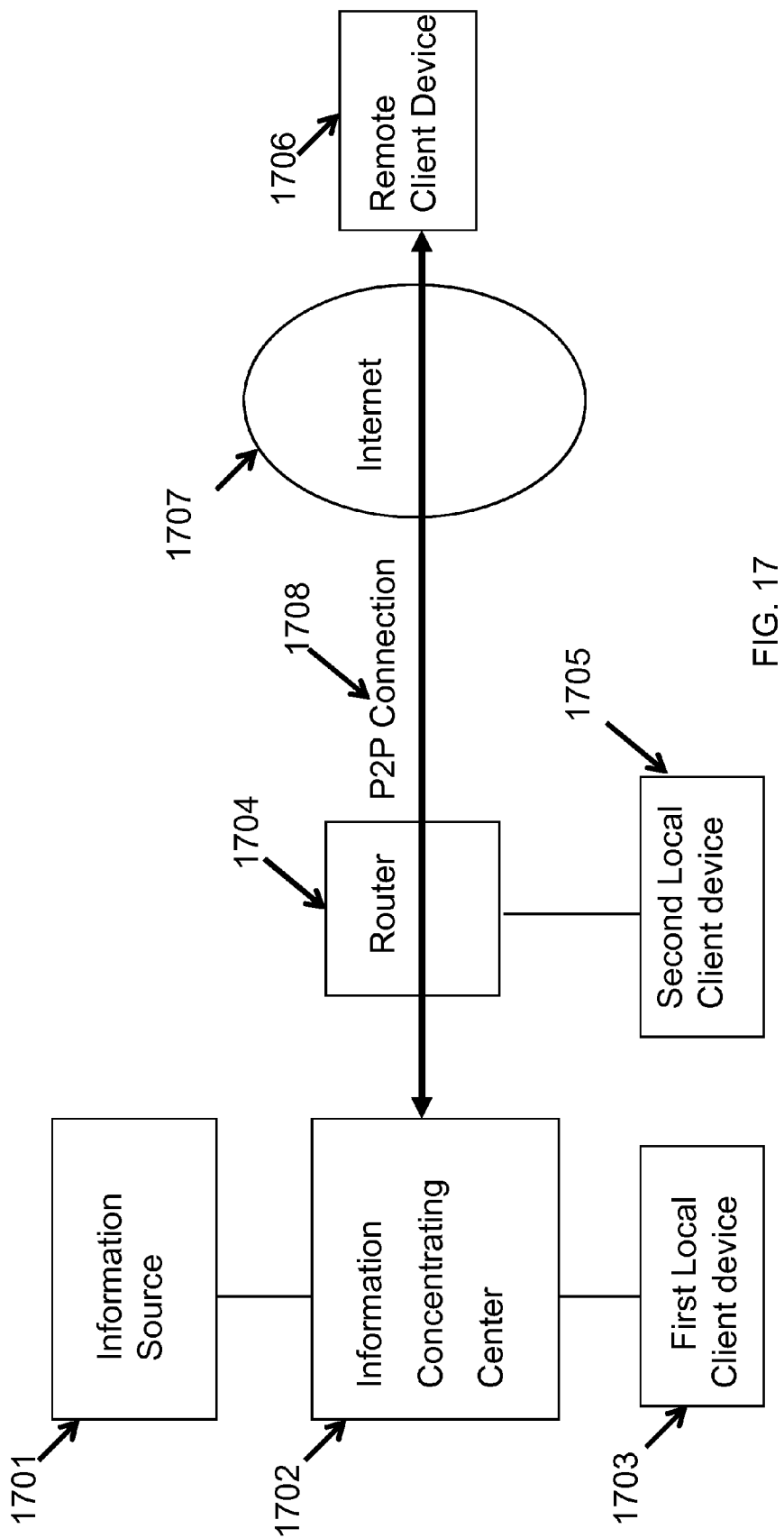
FIG. 17 illustrates a schematic of a system of connecting an information concentrating center to a remote client device through the Internet by using a P2P connection according to one embodiment of present invention.

As shown in FIG. 17, an Information Source 1701, connected to an information concentrating center 1702, can be any source that provides information. For example, the Information Source can be TV programs sent through satellite or a cable feed. A first local client device 1703, such as a TV, can be connected to the information concentrating center 1702. In addition, digital information, such as HDTV, can be transmitted from the information concentrating center 1702 though a router 1704 or a home network to a second local client device 1705, such as a TV, a mobile phone, tablet, notebook or PC. For example, a user can use a mobile phone to receive a TV program through router and wireless signals such as WIFI, even in a backyard of a home. In addition, a remote client device 1706, such as a mobile phone, can connect with the information concentrating center 1702 through the router 1704 and the Internet 1707 by using a P2P connection 1708 when the user is away from home, such as when the user is on vacation. In one embodiment, the information source 1701 includes at least one source that delivers the information to the information concentrating center 1702 without using the Internet, for example, a satellite feed or a cable feed for receiving TV programs or information. In one embodiment, the information concentrating center 1702 comprises a formatting module to format the information in a way suitable for viewing by the remote client device 1706.

Figure 18:
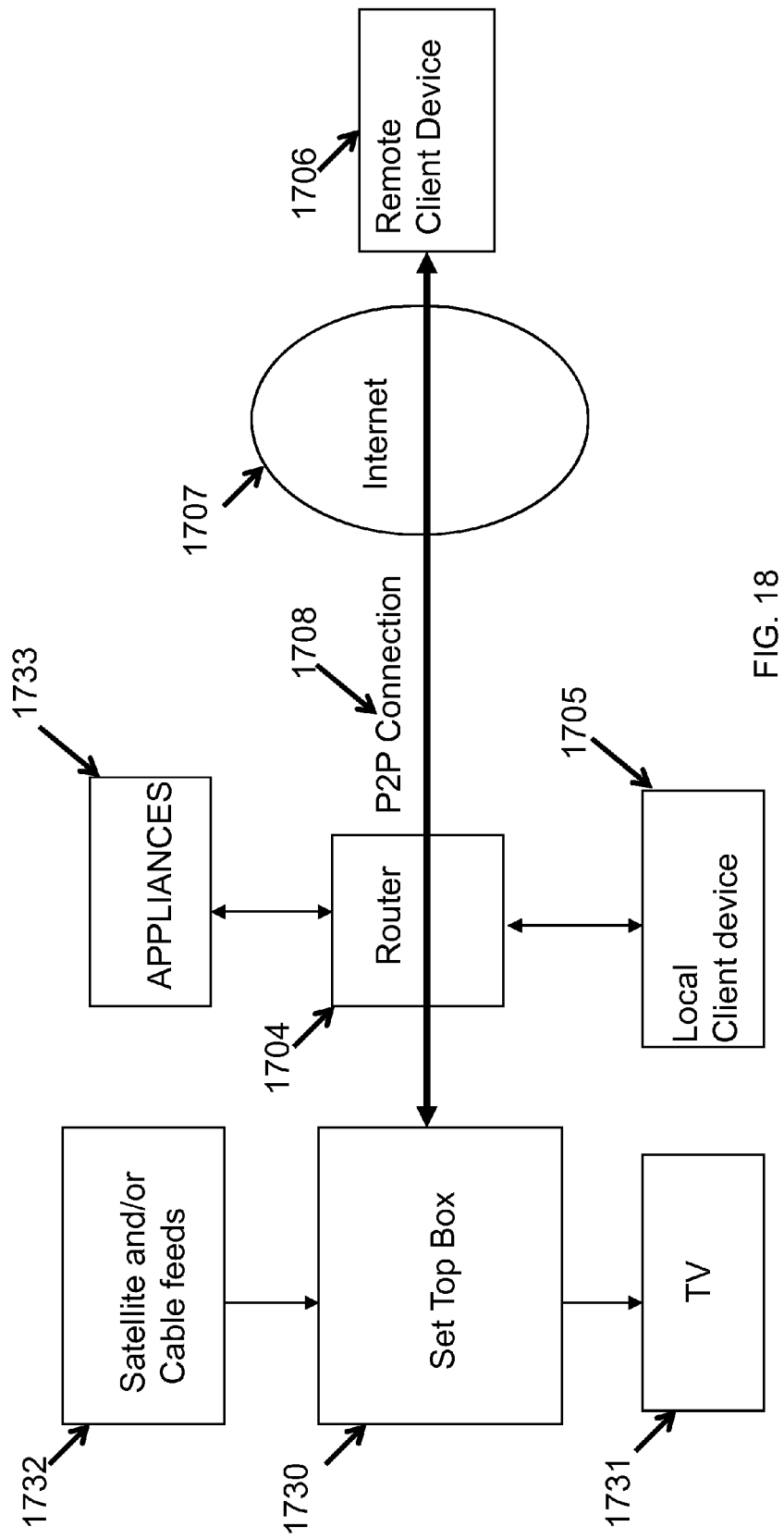
FIG. 18 illustrates a schematic of a system of connecting a set top box to a remote client device through the Internet by using a P2P connection according to one embodiment of present invention.

In one embodiment, FIG. 18 illustrates an example for connecting a plurality of devices to the information concentrating center such as a set top box 1730 which serves as a service device for providing information to client devices such as a TV 1731, wherein information source such as satellite and/or cable feeds 1732 are connected to the set top box 1730. The remote client device 1706, such as a mobile phone, PAD, notebook or other electronic device, can connect to the set top box 1730 through the router 1704 and the Internet 1707 by using the P2P connection 1708. At home, some appliances 1733 can be connected to the set top box 1730 through router 1704 so that the remote client device 1706, such as a mobile phone, PAD, notebook or other electronic device, can check the status of the appliances 1733 or send commands to the set top box 1730 in order to control the appliances 1733. In addition, a local client device 1705, such as a mobile phone, PAD, notebook or other electronic device, can view the TV programs at home through the router 1704 using either wired or wireless transmission methods.

As described in U.S. patent application Ser. Nos. 13/293,506 and 13/950,281, a home device such as the information concentrating center can register its UID (Unique Identification) into a linking server, and a remote client device can then communicate with the linking server to establish a P2P connection from the remote client device to the information concentrating center. As long as the remote client device has the information of the UID of the information concentrating center device, the remote client device can contact the linking server to make a P2P connection to the information concentrating center.

Figure 19:
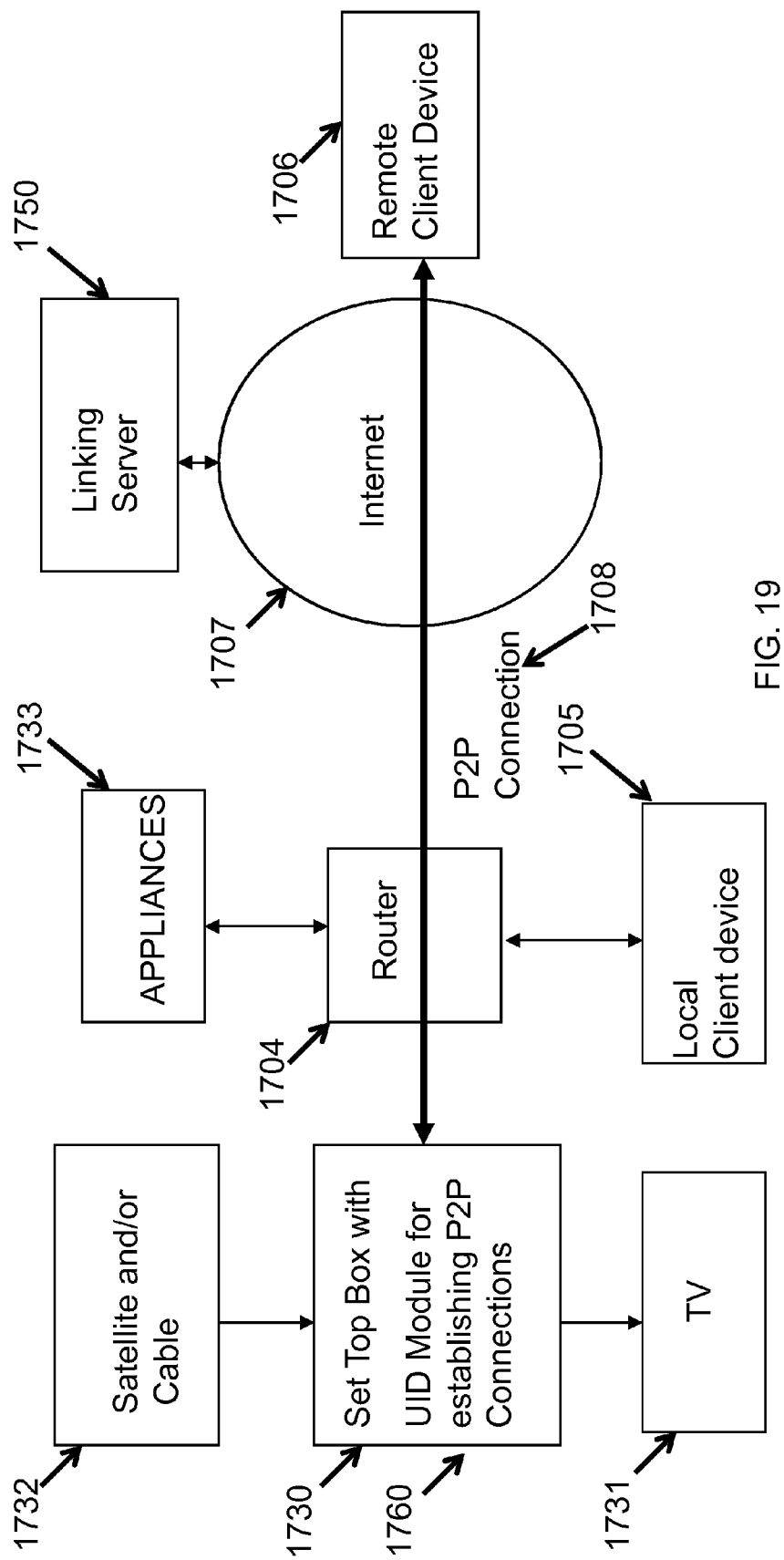
FIG. 19 illustrates a schematic of a system for establishing a P2P connection by using a Unique Identification associated with the set top box and a linking server.

FIG. 19 illustrates a linking server 1750 connected to the Internet 1704 for establishing the P2P connection 1708 between the information concentrating center such as a set top box 1730 and the remote client device 1706. The set top box 1730 has a UID module 1760 which can communicate with the linking server 1750 directly or through an administration server to obtain the address of the linking server first so that the linking server can be contacted by the set top box 1730 for registering a Unique Identification (UID) of the set top box 1730 in the linking server 1750. Afterwards, the remote client device 1706, such as a mobile phone, PAD, notebook or other electronic device, can communicate with the linking server directly or through the administration server to obtain the address of the linking server 1750 first so that the linking server 1750 can be contacted by the remote client device 1706 for establishing the P2P connection 1708 between the set top box 1730 and the remote client device 1706. The P2P connection 1708 can be set up quickly in this way without complex procedures. In addition, the bandwidth for carrying P2P connections is scalable due to the fact that each home user can establish a P2P connection to his/her own set top box separately without having bandwidth issues associated with video on demand (VoD) technology.

As described in U.S. patent application Ser. Nos. 13/293,506 and 13/950,281, in one embodiment, an image sensor can be used to generate an image of a pattern, such as a one dimensional Bar Code or a QR code, for inputting the UID of the information concentrating center to establish a P2P connection from a remote client device to the information concentrating center.

Please note that all the descriptions, in U.S. patent application Ser. Nos. 13/293,506 and 13/950,281, can be integrated in whole or in part with the information concentrating center for establishing a P2P connection with a remote client device, such as a mobile phone, notebook, PC PAD, or other suitable electronic devices.

In one embodiment, the information concentrating center has a first unique identification (UID) that is registered in at least one linking server, wherein the remote client device contacts the at least one linking server for establishing the P2P connection according to the first unique identification (UID) of the information concentrating center.

In one embodiment, the remote client device is not registered in the at least one linking server with a second unique identification (UID) when the remote client device contacts the at least one linking server for establishing the P2P connection with the information concentrating center.

In one embodiment, the remote client does not have a unique identification (UID) to register to the linking server when the remote client device sends the first message to the linking server for establishing the P2P connection with the information concentrating center.

In one embodiment, the linking server transmits hole-punching messages to the information concentrating center and the remote client device to establish the P2P connection.

In one embodiment, a unique identification (UID) of the information concentrating center is embedded in the information concentrating center when the information concentrating center is manufactured, wherein the unique identification (UID) of the information concentrating center is created without using networking addressing information, such as an IP address. Likewise, the aforementioned second unique identification (UID) does not include networking addressing information, such as an IP address.

Please note that there are many ways to establish P2P connections between the information concentrating center and a remote client device through the Internet, and present invention is not limited to the ways of establishing the P2P connections, as long as a P2P connection is used for connecting the information concentrating center and a remote client device.

The foregoing descriptions of specific embodiments of the present invention have been presented for purposes of illustrations and description. They are not intended to be exclusive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to particular use contemplated. It is intended that the scope of the invention be defined by the claims appended hereto and their equivalents.

What is claimed is:

1. An electronic device for concentrating information, comprising:
   at least one first interface for receiving information from at least one information source;
   a second interface coupling to the Internet, for establishing a connection with a remote client device through the Internet;
   a third interface for connecting to a television for viewing said information; and
   a unique identification (UID) embedded in the electronic device for concentrating information, wherein the electronic device for concentrating information contacts at least one linking server through the Internet to register said embedded unique identification (UID) into the at least one linking server for identifying network addressing information of the electronic device for concentrating information so as to enable the remote client device to establish a P2P connection with the electronic device for concentrating information for viewing said information received by the electronic device for concentrating information;
   wherein the remote client device contacts the at least one linking server through the Internet according to said unique identification (UID) of the electronic device for concentrating information for establishing a P2P connection between the remote client device and the electronic device for concentrating information via the Internet, wherein at least one portion of the information received by the electronic device for concentrating information is delivered to the remote client device on the P2P connection, wherein the remote client device does not have a unique identification (UID) to register in the at least one linking server for associating connecting information of the remote client device when the remote client device contacts the at least one linking server for establishing the P2P connection.

2. The electronic device for concentrating information according to claim 1, wherein the electronic device for concentrating information is a set top box.

3. The electronic device for concentrating information according to claim 1, wherein the remote client device is a portable electronic device.

4. The electronic device for concentrating information according to claim 1, wherein the remote client device is a mobile phone.

5. The electronic device for concentrating information according to claim 1, wherein the remote client device is not registered in the at least one linking server while the P2P connection is being established.

6. The electronic device for concentrating information according to claim 5, wherein the at least one linking server transmits hole-punching messages to the electronic device for concentrating information and the remote client device to establish the P2P connection.

7. The electronic device for concentrating information according to claim 1, wherein the second interface couples to the Internet through an external routing device or an internal routing device.

8. The electronic device for concentrating information according to claim 7, wherein the routing device is an IP router.

9. The electronic device for concentrating information according to claim 7, wherein the electronic device for concentrating information is connected to an appliance through the routing device and the remote client device controls the appliance through the electronic device for concentrating information.

10. The electronic device for concentrating information according to claim 7, wherein the routing device has a wireless access point for connecting to a portable electronic device so as to deliver the information to the portable electronic device.

11. The electronic device for concentrating information according to claim 1, wherein the information source is a satellite feed comprising TV programs.

12. The electronic device for concentrating information according to claim 11, wherein the remote client device sends commands to the electronic device for concentrating information to switch the TV channel of the TV programs.

13. The electronic device for concentrating information according to claim 1, wherein the information source is a cable feed comprising TV programs.

14. The electronic device for concentrating information according to claim 13, wherein the remote client device sends commands to the electronic device for concentrating information to switch the TV channel of the TV programs.

15. The electronic device for concentrating information according to claim 1, wherein the at least one information source includes both a satellite feed and a cable feed.

16. The electronic device for concentrating information according to claim 1, wherein the information is formatted by the electronic device for concentrating information in a way suitable for viewing by the remote client device.

* * * * *